US009031758B1

(12) United States Patent
Goudy et al.

(10) Patent No.: US 9,031,758 B1
(45) Date of Patent: May 12, 2015

(54) ON-BOARD VEHICLE CONTROL SYSTEM AND METHOD FOR DETERMINING WHETHER A VEHICLE IS WITHIN A GEOGRAPHICAL AREA OF INTEREST

(71) Applicant: Nissan North America, Inc., Franklin, TN (US)

(72) Inventors: Roy W Goudy, Toyota (JP); Neal Probert, Farmington Hills, MI (US); Andrew Christensen, Livonia, MI (US); Jeremy S Chambers, Casco, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/197,141

(22) Filed: Mar. 4, 2014

(51) Int. Cl.
G06F 7/70 (2006.01)
B60W 50/00 (2006.01)
B60W 30/095 (2012.01)
B60W 30/09 (2012.01)
G01C 21/34 (2006.01)

(52) U.S. Cl.
CPC ............. B60W 50/00 (2013.01); B60W 30/095 (2013.01); B60W 30/09 (2013.01); G01C 21/3461 (2013.01)

(58) Field of Classification Search
USPC .......................................................... 701/70
See application file for complete search history.

(56) References Cited

U.S. PATENT DOCUMENTS

| 4,352,088 A | 9/1982 | Tsunoda |
| 4,644,327 A | 2/1987 | Patterson |
| 4,706,072 A | 11/1987 | Ikeyama |
| 5,788,336 A | 8/1998 | Trovato et al. |
| 5,845,250 A | 12/1998 | Vogten |
| 5,939,976 A | 8/1999 | Sasaki et al. |
| 5,940,010 A | 8/1999 | Sasaki et al. |

(Continued)

FOREIGN PATENT DOCUMENTS

| EP | 1962255 A1 | 8/2008 |
| JP | S59-102634 A | 6/1984 |

(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

Primary Examiner — Hussein A. Elchanti
(74) Attorney, Agent, or Firm — Global IP Counselors, LLP

(57) ABSTRACT

An on-board vehicle control system and method employ a storage device that stores information representing a plurality of boundary points of a boundary that circumscribes an area of interest, and a controller that obtains a vehicle location of a vehicle of interest, determines a first boundary point closest to the vehicle location, and generates data representing a geometric relationship between the first boundary point, the vehicle location and a second boundary point. The controller calculates reference point data representing a reference point based on the data representing the geometric relationship, determines coordinate condition data based on an angle between a predetermined direction and a reference line connecting between the first boundary point and the reference point, and determines whether the vehicle location lies within the area of interest based on a comparison between geographic coordinates of the vehicle location and the coordinate condition data.

21 Claims, 21 Drawing Sheets

(56) References Cited

U.S. PATENT DOCUMENTS

| | | | |
|---|---|---|---|
| 5,979,586 A | 11/1999 | Farmer et al. | |
| 6,008,741 A | 12/1999 | Shinagawa et al. | |
| 6,366,207 B1 | 4/2002 | Murphy | |
| 6,405,113 B1* | 6/2002 | Yamawaki et al. | 701/41 |
| 6,615,137 B2 | 9/2003 | Lutter et al. | |
| 6,700,504 B1 | 3/2004 | Aslandogan et al. | |
| 6,720,898 B1 | 4/2004 | Ostrem | |
| 6,791,471 B2 | 9/2004 | Wehner et al. | |
| 6,810,328 B2 | 10/2004 | Yokota et al. | |
| 7,274,288 B2 | 9/2007 | Nagata | |
| 8,000,897 B2 | 8/2011 | Breed et al. | |
| 8,175,796 B1 | 5/2012 | Blackburn et al. | |
| 8,340,894 B2 | 12/2012 | Yester | |
| 8,466,807 B2 | 6/2013 | Mudalige | |
| 8,548,729 B2 | 10/2013 | Mizuguchi | |
| 8,577,550 B2 | 11/2013 | Lu et al. | |
| 8,587,418 B2 | 11/2013 | Mochizuki et al. | |
| 8,639,426 B2 | 1/2014 | Dedes et al. | |
| 8,717,192 B2 | 5/2014 | Durekovic et al. | |
| 2002/0038171 A1* | 3/2002 | Deguchi et al. | 701/41 |
| 2009/0033540 A1 | 2/2009 | Breed et al. | |
| 2009/0140887 A1 | 6/2009 | Breed et al. | |
| 2009/0198412 A1 | 8/2009 | Shiraki | |
| 2010/0169009 A1 | 7/2010 | Breed et al. | |
| 2012/0016581 A1 | 1/2012 | Mochizuki et al. | |
| 2012/0140039 A1* | 6/2012 | Ota et al. | 348/46 |
| 2012/0218093 A1 | 8/2012 | Yoshizawa et al. | |
| 2013/0116915 A1 | 5/2013 | Ferreira et al. | |
| 2013/0179047 A1 | 7/2013 | Miller et al. | |
| 2013/0278440 A1 | 10/2013 | Robin et al. | |
| 2014/0136414 A1* | 5/2014 | Abhyanker | 705/44 |
| 2014/0316635 A1* | 10/2014 | Bando et al. | 701/25 |
| 2015/0046058 A1* | 2/2015 | Nagata | 701/93 |

FOREIGN PATENT DOCUMENTS

| | | |
|---|---|---|
| JP | S61-253238 A | 11/1986 |
| JP | 2000-127796 A | 5/2000 |
| JP | 2001-118199 A | 4/2001 |
| JP | 2003-51099 A | 2/2003 |
| WO | 03091966 A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of the Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harder, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14,2003).

* cited by examiner

ON-BOARD VEHICLE CONTROL SYSTEM AND METHOD FOR DETERMINING WHETHER A VEHICLE IS WITHIN A GEOGRAPHICAL AREA OF INTEREST

BACKGROUND OF THE INVENTION

1. Field of the Invention

The present invention generally relates to an onboard vehicle control system and method. More specifically, the present invention relates to an on-board vehicle control system and method for determining whether a condition point lies within an area of interest and controlling a host vehicle based on the determination to, for example, suppress extraneous warning information.

2. Background Information

Recently, vehicles are being equipped with a variety of informational systems such as navigation systems, satellite radio systems, two-way satellite services, built-in cell phones, DVD players and the like. Various informational systems have been proposed that use wireless communications between vehicles and between infrastructures, such as roadside units. These wireless communications have a wide range of applications ranging from safety applications to entertainment applications. Also vehicles are sometimes equipped with various types of systems, such as global positioning systems (GPS), which are capable of determining the location of the vehicle and identifying the location of the vehicle on a map for reference by the driver. The type of wireless communications to be used depends on the particular application. Some examples of wireless technologies that are currently available include digital cellular systems, Bluetooth systems, wireless LAN systems and dedicated short range communications (DSRC) systems.

Also, vehicles can be equipped with a collision warning system that identifies the location of the vehicle and the locations of other nearby vehicles to determine whether the vehicle may come into contact with any of the other vehicles. The possibility of contact between vehicles can be particularly high at road intersections in which the travel paths of the vehicle and other nearby vehicles may intersect. If the possibility of contact exists, the system can issue a warning to the driver so that the driver can take the appropriate action.

SUMMARY OF THE INVENTION

As can be appreciated from the above, a need exists for an improved on-board vehicle control system for identifying the location of a vehicle or vehicles of interest for use in various vehicle applications such as in collision warning systems, braking systems, mapping systems and so on.

In accordance with one aspect of the present invention, an on-board vehicle control system and method are provided which employ a storage device and a controller. The storage device is configured to store information representing a plurality of boundary points of a boundary that circumscribes an area of interest. The controller is configured to obtain a vehicle location of a vehicle of interest, determine a first boundary point of the boundary points that is closest to the vehicle location, and generate data representing a geometric relationship between the first boundary point, the vehicle location and a second boundary point of the boundary points. The geometric relationship includes a first straight line connecting the first boundary point and the vehicle location, a second straight line connecting the second boundary point and the vehicle location and a third straight line connecting the first and second boundary points. The controller is further configured to calculate reference point data representing a reference point based on the data representing the geometric relationship, determine coordinate condition data based on an angle between a predetermined direction and a reference line connecting between the first boundary point and the reference point, and determine whether the vehicle location lies within the area of interest based on a comparison between geographic coordinates of the vehicle location and the coordinate condition data.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defamed by the appended claims and their equivalents.

Figure 1:
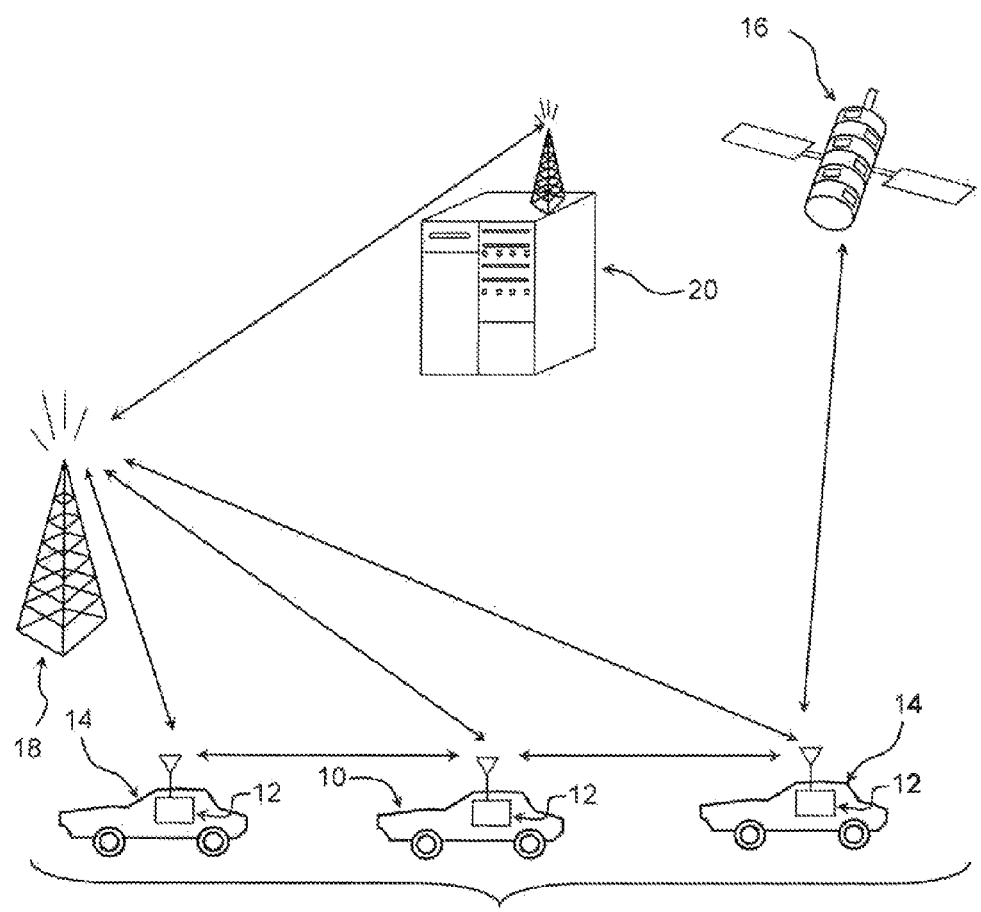
FIG. 1 is a schematic diagram illustrating an example of a host vehicle equipped with an on-board vehicle control system according to embodiments disclosed herein in relation to a remote vehicle and components of a global positioning system (GPS)

Referring initially to FIG. 1, a two-way wireless communications network is illustrated that includes vehicle to vehicle communication and vehicle to base station communication. In FIG. 1, a host vehicle (HV) 10 is illustrated that is equipped with an onboard vehicle control system 12 according to a disclosed embodiment, and two remote vehicles (RV) 14 that also includes the onboard vehicle control system 12. As discussed herein, the host vehicle 10 can also be referred to as a subject vehicle (SV). The remote vehicle 14 can also be referred to as a target or threat vehicle (TV). While the host vehicle (HV) 10 and the remote vehicles 14 are illustrated as having the same on-board vehicle control system 12, it will he apparent from this disclosure that each of the remote vehicles 14 can include another type of two-way communication system that is capable of communicating information about at least the location and speed of the remote vehicle 14 to the host vehicle 10.

The on-board vehicle control system 12 of the host vehicle 10 and the remote vehicle 14 communicates with the two-way wireless communications network. As seen in FIG. 1, for example, the two-way wireless communications network can include one or more global positioning satellites 16 (only one shown), and one or more roadside (terrestrial) units 18 (only one shown), and a base station or external server 20. The global positioning satellites 16 and the roadside units 18 send and receive signals to and from the on-board vehicle control system 12 of the host vehicle 10 and the remote vehicles 14. The base station 20 sends and receives signals to and from the on-board vehicle control system 12 of the host vehicle 10 and the remote vehicles 14 via a network of the roadside units 18, or any other suitable two-way wireless communications network.

Figure 2:
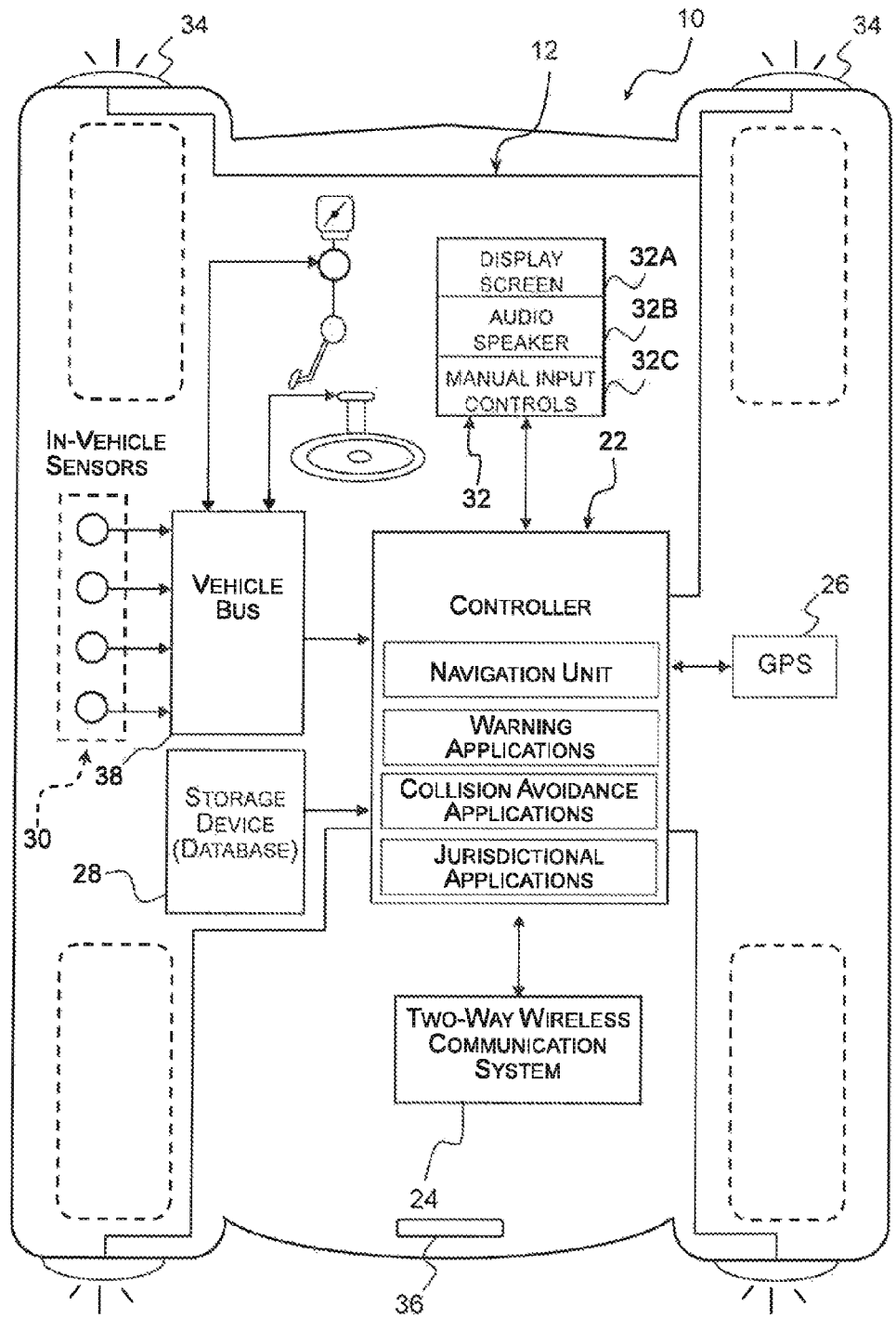
FIG. 2 is a block diagram of exemplary components of the host vehicle equipped with an on-board vehicle control system according to embodiments disclosed herein.

As shown in more detail in FIG. 2, the on-board vehicle control system 12 includes an application controller 22 that can be referred to simply as a controller 22. The controller 22 preferably includes a microcomputer with a control program that controls the components of the on-board vehicle control system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to control the on-board vehicle control system 12 in accordance with the flow chart of FIG. 8 as discussed below. It will be apparent to those skilled in the at from this disclosure that the precise structure and algorithms for the controller 22 can be any combination of hardware and software that will carry out the functions of the present invention. Furthermore, the controller 22 can communicate with the other components of the on-board vehicle control system 12 discussed herein via, for example a controller area network (CAN) bus or in. any other suitable manner as understood in the art.

As shown in more detail in FIG. 2, the on-board vehicle control system 12 can further include a wireless communication system 24, a global positioning system (GPS) 26, a storage device 28, a plurality of in-vehicle sensors 30 and a human-machine interface unit 32. The human-machine interface unit 32 includes a screen display 32A, an audio speaker 32B and various manual input controls 32C that are operatively coupled to the controller 22. The screen display 32A and the audio speaker 32B are examples of interior warning devices that are used to alert a driver. Of course, it will be apparent to those skilled in the art from this disclosure that interior warning devices include anyone of or a combination of visual, audio and/or tactile warnings as understood in the art that can be perceived inside the host vehicle 10. The host vehicle 10 also includes a pair of front headlights 34 and rear brake lights 36, which constitutes examples of exterior warning devices of the on-board vehicle control system 12. These components can communicate with each other and in particular, with the controller 22 in any suitable manner, such as wirelessly or via a vehicle bus 38.

The wireless communications system 24 can include an omni-directional antenna and a multi-directional antenna, as well as communication interface circuitry that connects and exchanges information with a plurality of the remote vehicles 14 that are similarly equipped, as well as with the roadside units 20 through at least a portion of the wireless communications network within the broadcast range of the host vehicle 10. For example, the wireless communications system 24 can be configured and arranged to conduct direct two way communications between the host and remote vehicles 10 and 14 (vehicle-to-vehicle communications) and the roadside units 18 (roadside-to-vehicle communications). Moreover, the wireless communications system 24 can be configured to periodically broadcast a signal in the broadcast area. The wireless communication system 24 can he any suitable type of two-way communication device that is capable of communicating with the remote vehicles 14 and the two-way wireless communications network. In this example, the wireless communication system 24 can include or be coupled to a dedicated short range communications (DSRC) antenna to receive, for example, 5.9 GHz DSRC signals from the two-way wireless communications network. These DSRC signals can include basic safety messages (BSM) defined by current industry recognized standards that include information which, under certain circumstances, can be analyzed to warn drivers of a potential problem situation or threat in time for the driver of the host vehicle 10 to take appropriate action to avoid the situation. For instance, the DSRC signals can also include information pertaining to weather conditions, adverse driving conditions and so on. In the disclosed embodiments, a BSM includes information in accordance with SAE Standard J2735 as can be appreciated by one skilled in the art. Also, the wireless communication system 24 and the GPS 26 can be configured as a dual frequency DSRC and GPS devices as understood in the art.

The GPS 26 can be a conventional global positioning system that is configured and arranged to receive global positioning information of the host vehicle 10 in a conventional manner. Basically, the global positioning system 26 receives GPS signals from the global positioning satellite 16 at regular intervals (e.g. one second) to detect the present position of the host vehicle 10. The GPS 26 has an accuracy in accordance with industry standards and thus, can indicate the actual vehicle position of the host vehicle 10 within a few meters or less (e.g., 10 meters less). The data representing the present position of the host vehicle 10 is provided to the controller 22 for processing as discussed herein. For example, the controller 22 can include or be coupled to navigation system components that are configured and arranged to process the GPS information in a conventional manner as understood in the art.

The storage device 28 can store road map data as well as other data that can be associated with the road map data such as various landmark data, fueling station locations, restaurants, weather data, traffic information and so on. Furthermore, the storage device 28 can store other types of data, such as data pertaining to vehicle-related parameters and vehicle conditions. For example, the vehicle-related parameters can include predetermined data indicating relationships between vehicle speed, vehicle acceleration, yaw, steering angle, etc. when a vehicle is preparing to make a turn. In this event, the storage device 28 can farther store data pertaining to vehicle conditions, which can represent a determined vehicle condition of a vehicle of interest, such as the host vehicle 10, a remote vehicle 14, or both, This determined vehicle condition can represent, for example, a vehicle speed and acceleration that is determined for the vehicle of interest at a moment in time. Accordingly, the embodiments disclosed herein can evaluate whether the vehicle condition lies within the area of interest, as represented by the vehicle-related parameters, to determine, for example, whether the vehicle of interest is preparing to make a turn. The storage device 28 can include, for example, a large-capacity storage medium such as a CD-ROM (Compact Disk-Read Only Memory) or IC (Integrated Circuit) card. The storage device 28 permits a read-out operation of reading out data held in the large-capacity storage medium in response to an instruction from the controller 22 to, for example, acquire the map information and/or the vehicle condition information as needed or desired for use in representing the location of the host vehicle 10, the remote vehicle 14 and other location information and/or vehicle condition information as discussed herein for route guiding, map display, turning indication, and so on as understood in the art. For instance, the map information can include at least mad links indicating connecting states of nodes, locations of branch points (road nodes), names of roads branching from the branch points, place names of the branch destinations, and so on. The information in the storage device 28 can also be updated by the controller 22 or in any suitable manner as discussed herein and as understood in the art.

The in-vehicle sensors 30 are configured to monitor various devices, mechanisms and systems within the host vehicle 10 and provide information relating to the status of those devices, mechanisms and systems to the controller 22. For example, the in-vehicle sensors 30 can be connected to a traction control system, a windshield wiper motor or wiper motor controller, a headlight controller, a steering system, a speedometer, a braking system and so on as understood in the art.

As will now be discussed with reference to FIGS. 3 to 7, the on-board vehicle control system 12 can operate to determine whether a condition is inside (condition 104A) or outside (condition 104B) the area of interest 100. The condition can represent any type of condition, such as those discussed herein. For instance, in one exemplary embodiment, the on-board vehicle control system 12 can evaluate whether a vehicle condition representing a speed and acceleration of a vehicle of interest, such as the host vehicle 10 or the remote vehicle 14 is inside or outside the area of interest 100, which in this exemplary embodiment represents predetermined vehicle speed and acceleration data, to determine whether the vehicle of interest is preparing to make a turn. Also, the on-board vehicle control system 12 can determine whether the location of a vehicle of interest, such as the host vehicle 10, the remote vehicle 14, or both, is present within an area of interest 100, which represents a geographical area. In other words, either the host vehicle 10 and/or one or more the remote vehicles 14 can be considered to be a vehicle of interest by the on-board vehicle control system 12, The on-board vehicle control system 12 controls an aspect of the host vehicle 10 differently upon a determination of the vehicle of interest (i.e., the host vehicle 10 and/or one or more the remote vehicles 14) is located within the area of interest 100 from a determination of the vehicle of interest (i.e., the host vehicle 10 and/or one or more the remote vehicles 14) is located outside of the area or interest. The term "aspect" as used herein with respect to the host vehicle 10 refers to any component, application, and/or application parameter of the host vehicle 10.

Figure 3:
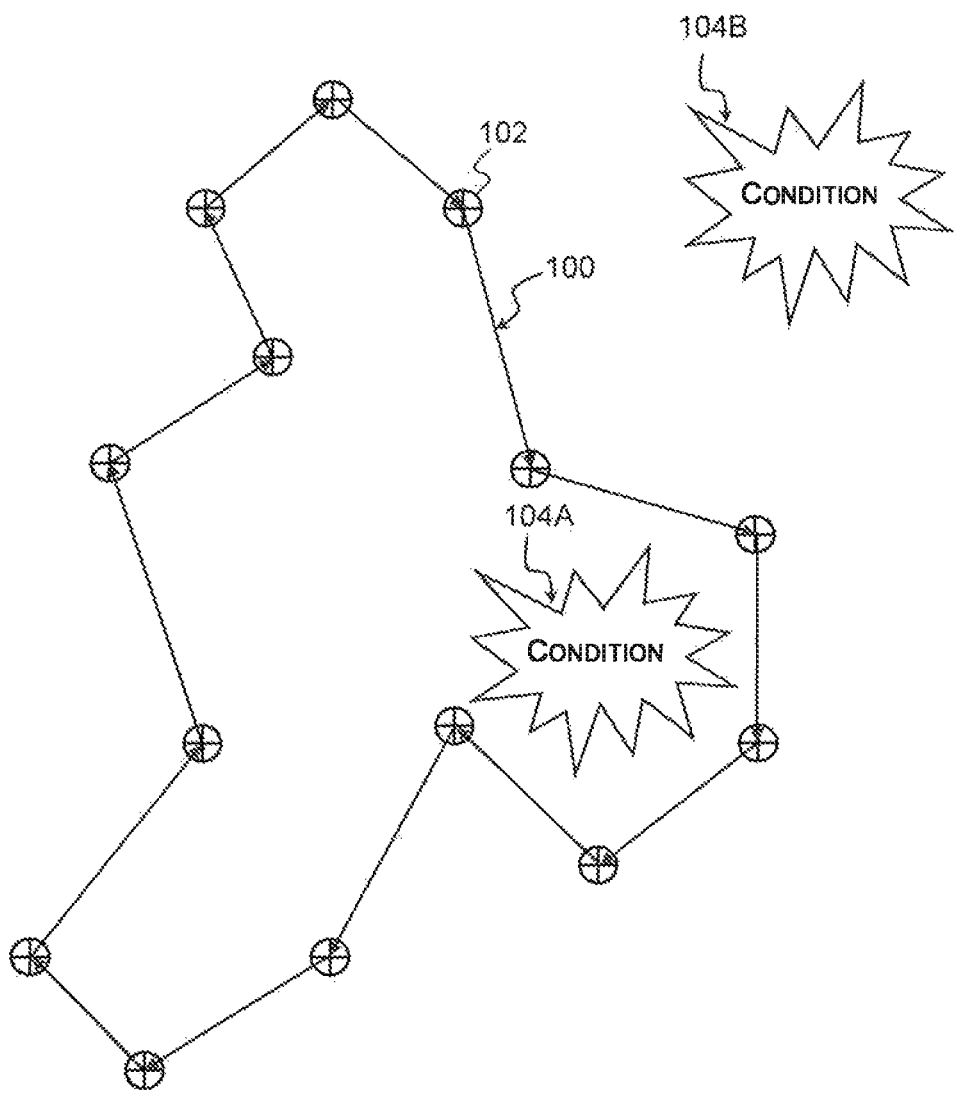
FIG. 3 is a diagrammatic view illustrating an example of an area of interest that represents a relationship between a plurality of vehicle-related parameters and a vehicle condition, and which is evaluated according to the embodiments described herein.
Figure 4:
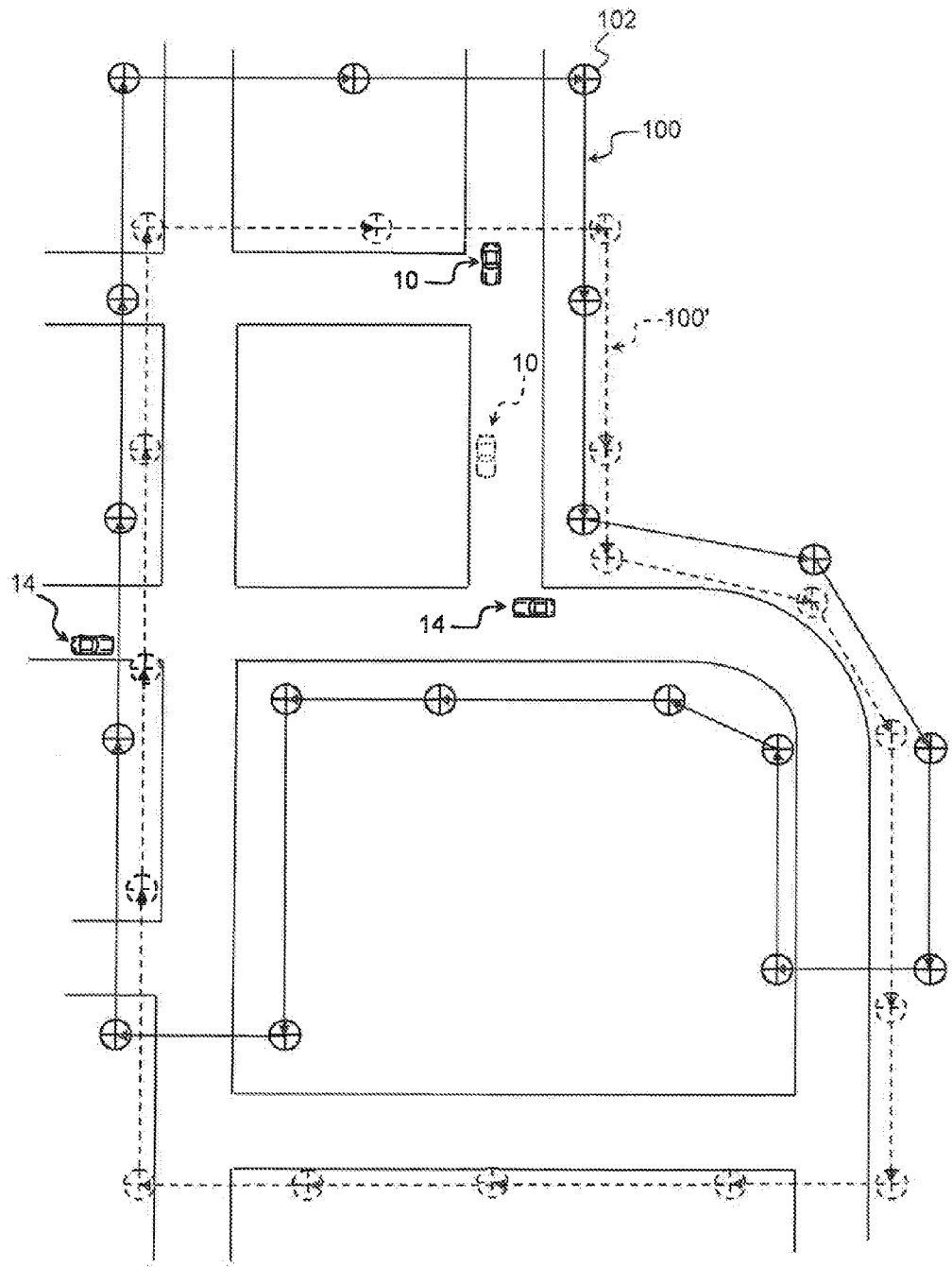
FIG. 4 is a diagrammatic view illustrating an example of an area of interest that represents a geographic location in relation to a location of a vehicle of interest as evaluated according to the embodiments described herein.
Figure 5:
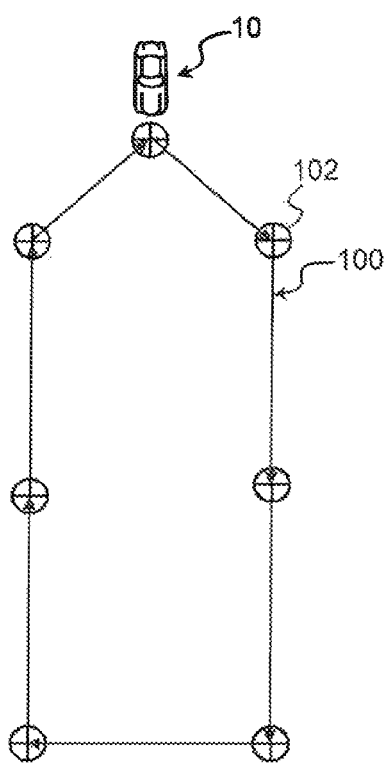
FIG. 5 is diagrammatic view illustrating an example of the locations of the area of interest as shown in FIG. 4 with respect to a host vehicle.
Figure 6:
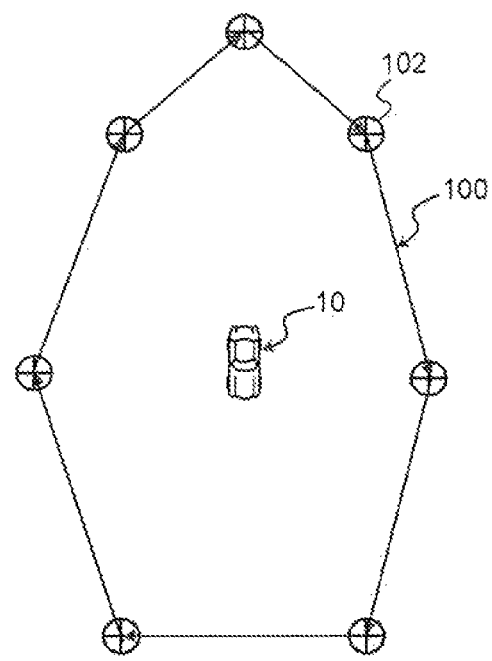
FIG. 6 is diagrammatic view illustrating an example of the locations of the area of interest as shown in FIG. 4 with respect to a host vehicle.
Figure 7:
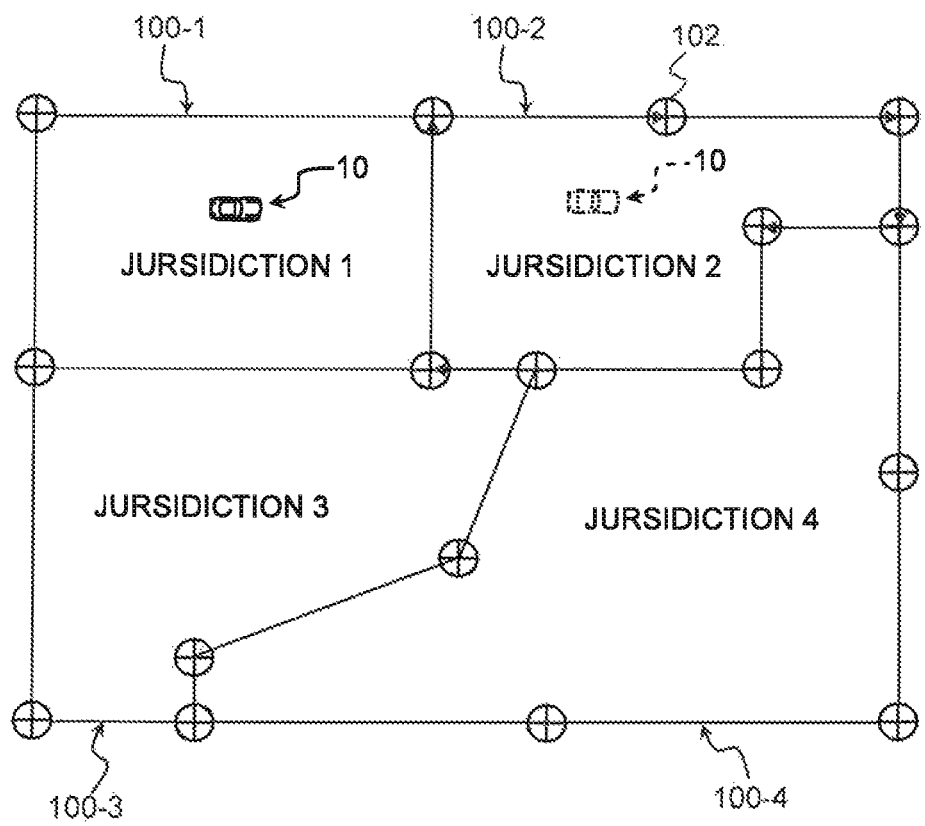
FIG. 7 is a diagrammatic view illustrating exemplary relationships between areas of interest and jurisdictional boundaries.

The area of interest 100 can be defined by a plurality of boundary points 102 as shown in FIG. 3. For instance, the area of interest 100 can be a particularly complex area defined by scattered boundary points that define a complex boundary that can vary in an irregular, non-symmetrical manner as defined by the boundary points 102. The boundary points 102 can be represented by, for example, a series of experimental and/or historical data points. The boundary points 102 can be represented by, for example, data sets (e.g., x, y coordinates) that represent a relationship between vehicle-related parameters, such as vehicle speed and acceleration. The data sets are stored in the database of the storage device 28 or otherwise provided to the on-board vehicle control system 12 via the wireless communications network in any suitable manner. The vehicle condition shown in FIG. 3 can represent a determined speed and acceleration of the vehicle of interest at a moment in time. In another example, such as that shown in FIGS. 4 through 7, the boundary points 102 can be represented by, for example, longitude and latitude data sets (e.g., x, y coordinates) that are stored in the database of the storage device 28 or otherwise provided to the on-board vehicle control system 12 via the wireless communications network 16 on in any suitable manner. For example, the boundary points 102 can represent terrestrial points on the earth, which can correspond to the locations of the roadside units 20 or any other suitable locations. Also the area of interest 100 can be either a dynamic area that changes as shown in FIGS. 4 to 6, or a static area that remains stationary as shown in FIG. 7. The number of boundary points 102 and the distance between the boundary points 102 for any given one of the areas of interest 100 can vary as needed and/or desired to accomplish the desired result of the application in which the system is being used.

As can be appreciated from FIG. 4, the area of interest 100 can move, for example, in accordance with movement of the host vehicle 10 or due to other reasons, such as changes in environmental conditions, change in traffic conditions and so on as discussed herein. Thus, as the host vehicle 10 moves from a first location (shown in solid lines) to a second location (shown in broken lines), the area of interest 100 can shift to become area of interest 100' represented in phantom lines. As seen in FIG. 4, the shape of the area of interest 100 not only shifted but also changed in shape in accordance with map data.

As can further be appreciated from FIGS. 5 and 6, the area of interest 100 can be defined proximate to the host vehicle 10 (e.g., in front of the host vehicle 10) as shown in FIG. 5, or can encompass the host vehicle 10 as shown in FIG. 6. Furthermore, as shown in FIG. 7, the area of interest 100 can represent particular jurisdictions (Jurisdictions 1 to 4) that are each governed by respective traffic laws, etc. that may be different from each other. Thus, the on-board vehicle control system 12 can control one or more aspects of the host vehicle upon determining that the host vehicle 10 is located within the area of interest 100. In the example shown in FIG. 7, four areas of interest are represented as areas of interest 100-1 through 100-4 corresponding to Jurisdictions 1 through 4, respectively. As described herein, the on-board vehicle control system 12 can determine whether the host vehicle 10 lies in a particular one of the Jurisdictions 1 to 4. For example, if one of the Jurisdictions 1 to 4 requires headlights to be turned "on" while on highways, then the controller 22 can turn on the headlights 34 upon determining that the host vehicle 10 is located within that Jurisdiction and on a highway based on the navigation system. Also, one or more of the Jurisdictions 1 through 4 may permit hands-free telephone use only. Accordingly, the controller 22 can issue a warning to the driver of the host vehicle 10 about this requirement. Furthermore, the Jurisdictions 1 through 4 may have different regulations with regard to the location of a vehicle with respect to an intersection when the light at the intersection is turning from green to amber and then to red. Therefore, the controller 22 can control the vehicle intersection warning system to operate in compliance with the requirements of the Jurisdiction 1 through 4 in which the vehicle of interest is present.

An example of operations that are performed by the on-board vehicle control system 12 to determine whether a vehicle of interest (e.g., the host vehicle 10 and/or the remote vehicle 14) are present within an area of interest will now be described with reference to the flowchart in FIG. 8 and the diagrams in FIGS. 9-22.

In step S11, the processing stores information representing a plurality of boundary points 102-1 through 102-8 of a boundary that circumscribes the area of interest 100. In step S12, the processing obtains a vehicle condition of a vehicle of interest, which is represented by a condition point $p_k$. The vehicle condition can be determined in any suitable manner. For example, if the vehicle condition represents speed and acceleration of the vehicle of interest, the data representing the vehicle speed and acceleration can be determined based on information that can represent braking and accelerator pedal information, steering wheel information and so on provided to the controller 22 via the sensors 30, which can include signals from, for example, vehicle speed and vehicle accelerator sensors. If the vehicle condition represents, for example, the location of the vehicle of interest, the vehicle location can be determined in any suitable manner, such as by using GPS information representing the longitude and latitude of the vehicle of interest.

Figure 9:
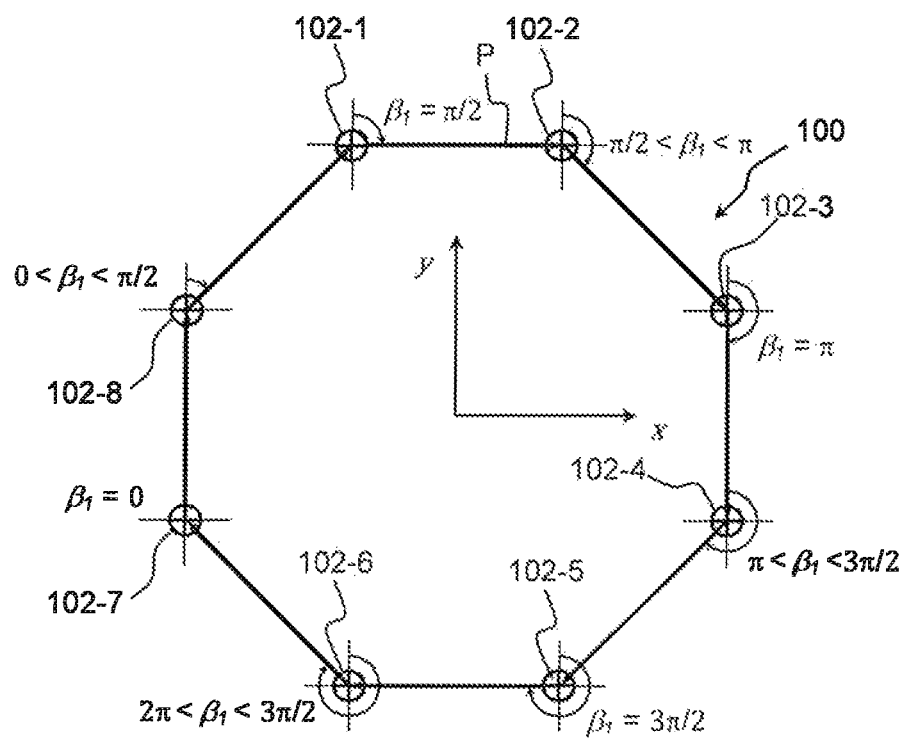
FIGS. 9-22 are diagrammatic views illustrating examples of the relationships between the determined values and boundary points defining the area of interest as used in accordance with the process shown in the flowchart of FIG. 8.

As shown in FIG. 9, the area of interest 100 for purposes of these examples can be any two-dimensional area, regardless of shape, that is represented by a 360-degree path P where the start and end points are the same. In this example, the start and end points are represented by boundary point 102-1, with the other exemplary boundary points being represented by points 102-2 through 102-8. The processing performed by the on-board vehicle control system 12 determines whether the vehicle condition (e.g., the determined speed and acceleration of the vehicle of interest, or the location of a vehicle of interest as discussed herein) as represented by the condition point $p_k$, falls inside or outside the area of interest 100. The number of the points 102-1 through 102-8 used to define the path P is immaterial, as any suitable number of the points 102 can be used as needed to accurately define the area of interest 100. Likewise, the distance between the points 102 can vary as needed to accurately define the area of interest 100.

In this example, the processing is performed by starting at one of the points 102, such as point 102-1, and continuing clockwise around the path P from sequential point to point. However, the processing can start at any of the points 102, and can proceed in a clockwise or counterclockwise manner as can be understood by one skilled in the art. It should be noted that the processing should be performed either in the clockwise manner or counterclockwise manner while completing the calculations discussed below to make one determination whether the vehicle condition lies within or outside the area of interest 100.

Figure 10:
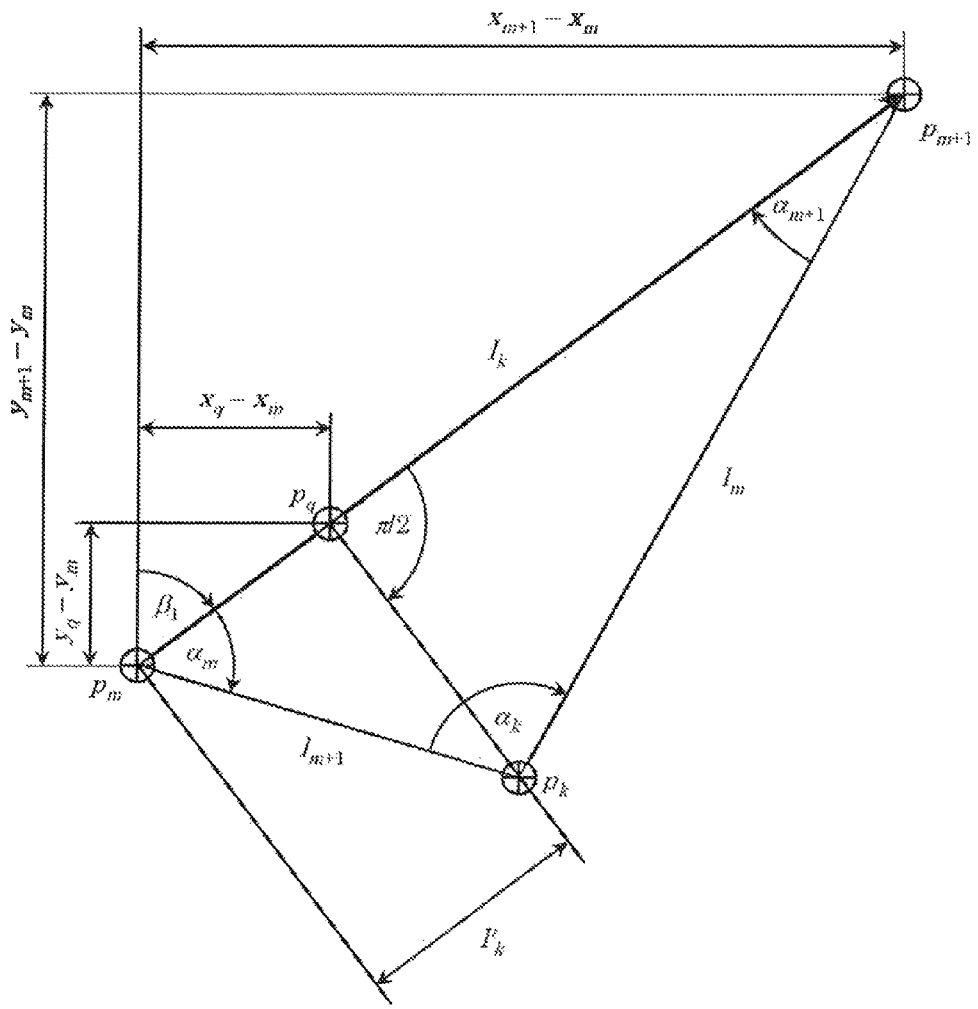

A line segment between two consecutive points on the path P can be characterized in one of eight ways as can be appreciated from FIG. 10. For instance, a line segment can be characterized by an angle $\beta_1$ between the line segment and a predetermined direction.

Mathematically, the angle $\beta_1$ can be expressed as follows $$\beta_1 = \pi \left( \frac{x_m - x_{m+1} + \sigma}{|x_m - x_{m+1}| + \sigma} + 1 \right) - \cos^{-1}\left( \frac{y_{m+1} - y_m}{\sqrt{(x_{m+1} - x_m)^2 + (y_{m+1} - y_m)^2}} \right)\left( \frac{x_m - x_{m+1} + \sigma}{|x_m - x_{m+1}| + \sigma} \right)$$

The length of the line $l_k$ between two consecutive points is a straight line defined as follows:

$$l_k = \sqrt{(x_{m+1} - x_m)^2 + (y_{m+1} - y_m)^2}$$

The following exemplary calculations can be made to determine whether a condition point $p_k$ lies within or outside the boundary defined by the circumferential path P. This determination can be made by using the following steps:

First, in step S13, the processing determines via the on-board vehicle controller 22 which of the boundary points is closest to the vehicle condition (e.g. the point representing the vehicle speed and acceleration, or the point representing the vehicle location), and the processing further generates geometric data in step S14, as described below. As shown in FIG. 10, the point $p_m$ (with coordinates $x_m$ and $y_m$) on the path P that is closest to the condition point $p_k$ (with coordinates $x_k$ and $y_k$) can be determined by sequentially, in a predetermined direction (e.g. clockwise or counterclockwise), calculating the straight-line distance between each boundary point along the path P and the condition point $p_k$, and then choosing the boundary point at the shortest straight-line distance. This distance $l_{m+1}$ is defined as follows:

$$l_{m+1} = \sqrt{(x_k - x_m)^2 + (y_k - y_m)^2}$$

After the point on the path P that is closest to the condition point $p_k$ has been identified, the processing generates via the on-board vehicle controller 22 geometric data representing a geometric relationship between the first boundary point $p_m$, the condition point $p_k$ and a second boundary point of the boundary points as will now be described. That is, the next consecutive point $p_{m+1}$ in the predetermined direction along the path is chosen and a triangle is defined as shown in FIG. 10, where:

$$l_k = \sqrt{(x_{m+1} - x_m)^2 + (y_{m+1} - y_m)^2}$$
$$l_m = \sqrt{(x_{m+1} - x_k)^2 + (y_{m+1} - y_k)^2}$$
$$l_{m+1} = \sqrt{(x_m - x_k)^2 + (y_m - y_k)^2}$$

and from the Law of Cosines $$\cos\alpha_k = \frac{l_m^2 + l_{m+1}^2 - l_k^2}{2l_m l_{m+1}}$$

$$\cos\alpha_m = \frac{l_k^2 + l_{m+1}^2 - l_m^2}{2l_k l_{m+1}}$$

-continued $$\cos\alpha_{m+1} = \frac{l_k^2 + l_m^2 - l_{m+1}^2}{2l_k l_m}.$$

Different Cases 1 through 4 will now be described with reference to FIGS. 11 through 14 which indicate different possible relationships between the lines $l_k$, $l_m$ and $l_{m+1}$ identified in FIG. 10.

Case 1: $l_k^2 + l_{m+1}^2 - l_m^2 \geq 0$

Figure 11:
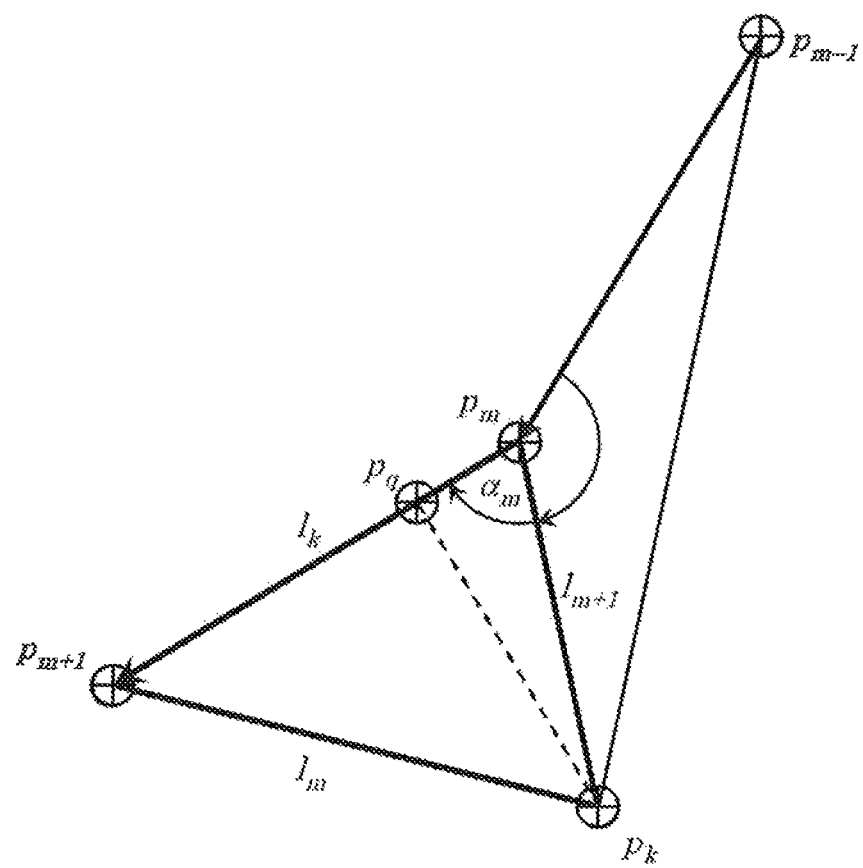

Referring to Figure 11, if $l_k^2 + l_{m+1}^2 - l_m^2 \geq 0$, $\cos\alpha_m$ is greater than 0 and the coordinates $x_q$ and $y_q$ are calculated as follows:

The value of $x_q$ is determined follows:

First:

$$l_k' = l_{m+1}\cos\alpha_m = l_{m+1}\frac{l_k^2 + l_{m+1}^2 - l_m^2}{2l_k l_{m+1}} = \frac{l_k^2 + l_{m+1}^2 - l_m^2}{2l_k}$$

Now:

$$x_q - x_m = l_k' \sin\beta_1$$

where $$\sin\beta_1 = \frac{x_{m+1} - x_m}{l_k}$$

and substitutions are made to obtain:

$$x_q - x_m = \frac{l_k^2 + l_{m+1}^2 - l_m^2}{2l_k}\left(\frac{x_{m+1} - x_m}{l_k}\right)$$

$$x_q - x_m = \left(1 + \frac{l_{m+1}^2 - l_m^2}{l_k^2}\right)\left(\frac{x_{m+1} - x_m}{2}\right)$$

$$x_q - x_m = \frac{x_{m+1} - x_m}{2} + \left(\frac{l_{m+1}^2 - l_m^2}{l_k^2}\right)\left(\frac{x_{m+1} - x_m}{2}\right)$$

$$x_q = \frac{x_{m+1} + x_m}{2} + \left(\frac{l_{m+1}^2 - l_m^2}{l_k^2}\right)\left(\frac{x_{m+1} - x_m}{2}\right)$$

which are expanded to obtain:

$$x_q = \frac{x_{m+1} + x_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{x_{m+1} - x_m}{2}\right)$$

The value of $y_q$ is determined as follows:

$$y_q - y_m = l_k' \cos\beta_1$$

where:

$$\cos\beta_1 = \frac{y_{m+1} - y_m}{l_k}$$

and substitutions are made to obtain:

$$y_q - y_m = \frac{l_k^2 + l_{m+1}^2 - l_m^2}{2l_k}\left(\frac{y_{m+1} - y_m}{l_k}\right)$$

-continued $$y_q - y_m = \left(1 + \frac{l_{m+1}^2 - l_m^2}{l_k^2}\right)\left(\frac{y_{m+1} - y_m}{2}\right)$$

$$y_q - y_m = \frac{y_{m+1} - y_m}{2} + \left(\frac{l_{m+1}^2 - l_m^2}{l_k^2}\right)\left(\frac{y_{m+1} - y_m}{2}\right)$$

$$y_q = \frac{y_{m+1} + y_m}{2} + \left(\frac{l_{m+1}^2 - l_m^2}{l_k^2}\right)\left(\frac{y_{m+1} - y_m}{2}\right)$$

which are expanded to obtain:

$$y_q = \frac{y_{m+1} + y_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{y_{m+1} - y_m}{2}\right)$$

Case 2: $l_k^2 + l_{m+1}^2 - l_m^2 < 0$ and $l_k^2 + l_{m-1}^2 - l_m^2 \geq 0$

Figure 12:
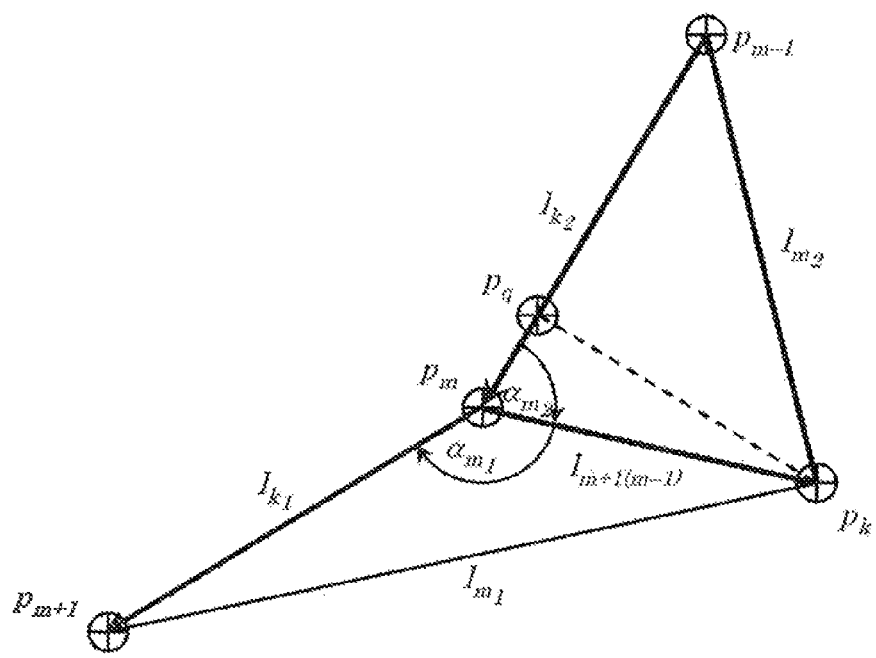

Referring to FIG. 12, if $l_k^2 + l_{m+1}^2 - l_m^2 < 0$ (i.e. $\cos\alpha_{m1} 0$) but $l_k^2 + l_{m-1}^2 - l_m^2 \geq 0$ (i.e. $\cos\alpha_{m2} \geq 0$), $p_m$ becomes $p_{m+1}$ and $p_{m-1}$ becomes $p_m$ and $x_q$ and $y_q$ are calculated in the same way as previously.

Thus:

$$x_q = \frac{x_{m+1} + x_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{x_{m+1} - x_m}{2}\right)$$

And $$y_q = \frac{y_{m+1} + y_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{y_{m+1} - y_m}{2}\right)$$

Case 3: $l_k^2 + l_{m+1}^2 - l_m^2 < 0$ and $l_k^2 + l_{m-1}^2 - l_m^2 < 0$

Figure 13:
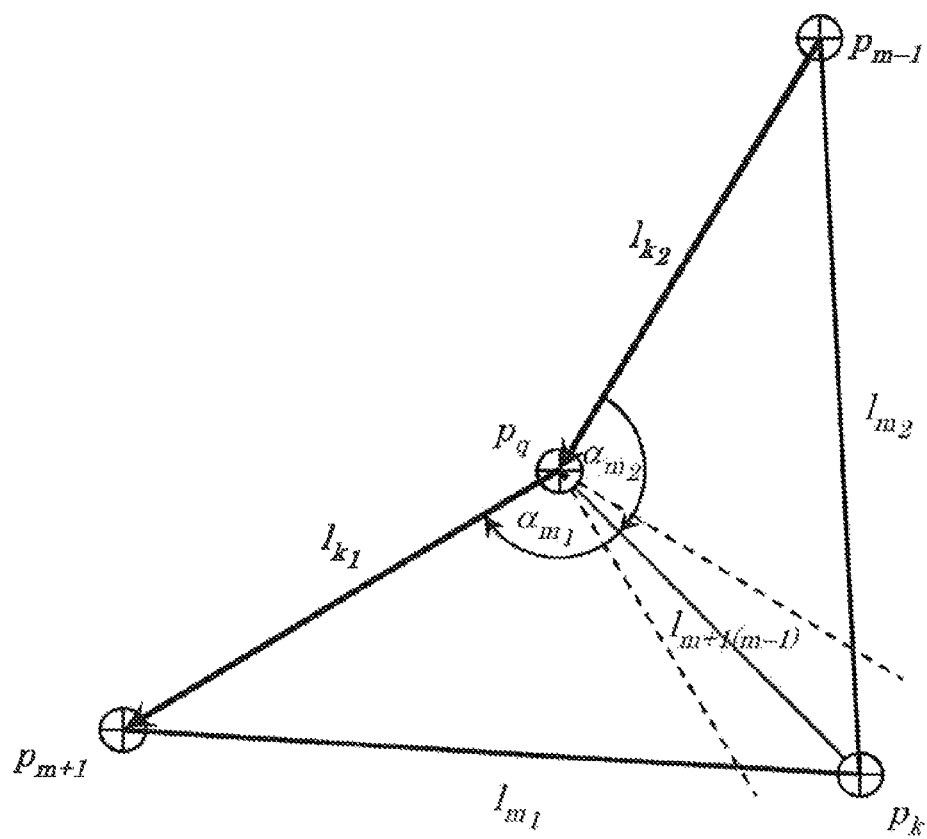
Figure 14:
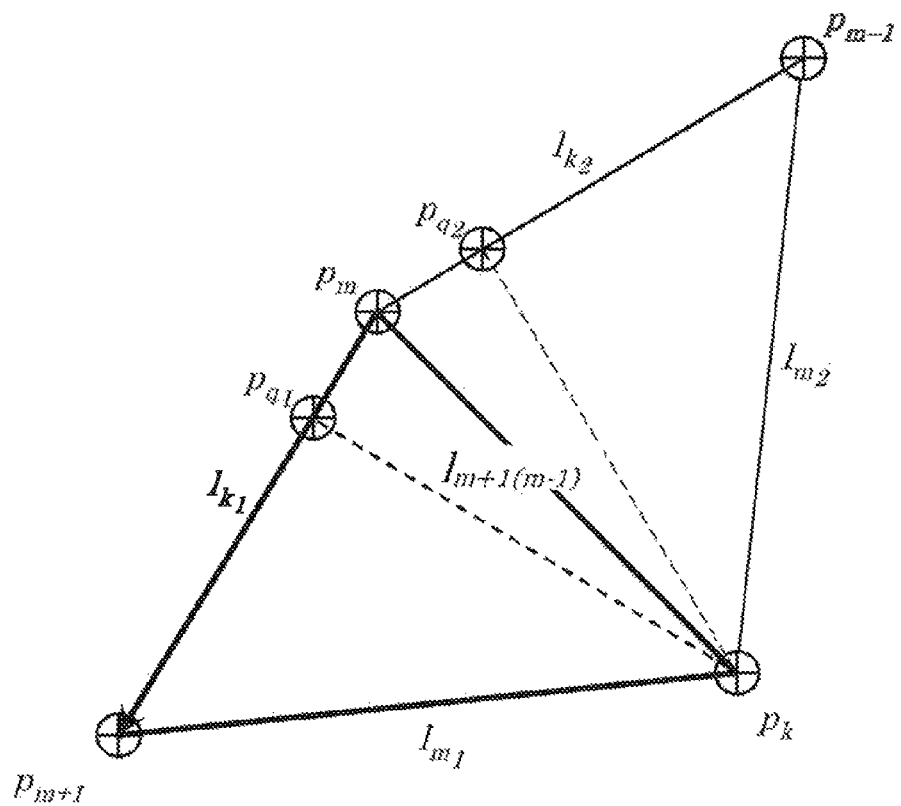

Referring to FIG. 13, it is possible that $l_k^2 + l_{m+1}^2 - l_m^2 < 0$ and $l_k^2 + l_{m-1}^2 - l_m^2 < 0$ (i.e. $\cos\alpha_{m1}$ and $\cos\alpha_{m2} < 0$). In this case, $p_m$ becomes $p_q$ Thus:

$$x_q = x_m$$

And $$y_q = y_m.$$

Case 4: $l_k^2 + l_{m+1}^2 - l_m^2 \geq 0$ and $l_k^2 + l_{m-1}^2 - l_m^2 \geq 0$ Referring to FIG. 14, it is possible that $l_k^2 + l_{m+1}^2 - l_m^2 \geq 0$ and $l_k^2 + l_{m-1}^2 - l_m^2 \geq 0$ (i.e. $\cos\alpha_{m1}$ and $\cos\alpha_{m2} \geq 0$). In this case, Case 1 applies.

Accordingly, the geometric relationship including a first straight line $l_{m+1}$ connecting the first boundary point $p_m$ and the condition point(e.g. the vehicle speed/acceleration or the vehicle location) $p_k$, a second straight line $l_m$ connecting the second boundary point $p_{m+1}$ and the condition point $p_k$ and a third straight line $l_k$ connecting the first and second boundary points $p_m$ and $p_{m+1}$. Furthermore, the calculations described above are performed in step S15 to calculate via the on-board vehicle controller 22 reference point data representing, a reference point $p_q$ based on the geometric data.

Referring back to FIG. 9, expressions to determine if the condition point $p_k$ is inside or outside the area defined by the circumferential path P can be determined for each of the eight characteristic configurations shown. With the coordinates of $p_q(x_q, y_q)$ known, the on-board vehicle control system 12 can perform the following calculations to determine whether the condition point $p_k$ lies within or outside the boundary defined by the circumferential path P. Thus, as described below, the processing performed in step S16 determine via the on-board vehicle controller 22 coordinate condition data based on an angle between a predetermined direction and a reference line connecting between the first boundary point $p_m$ and the reference point $p_q$.

Angle $\beta_1$ greater than or equal to 0 and less than $\pi/2$

Figure 15:
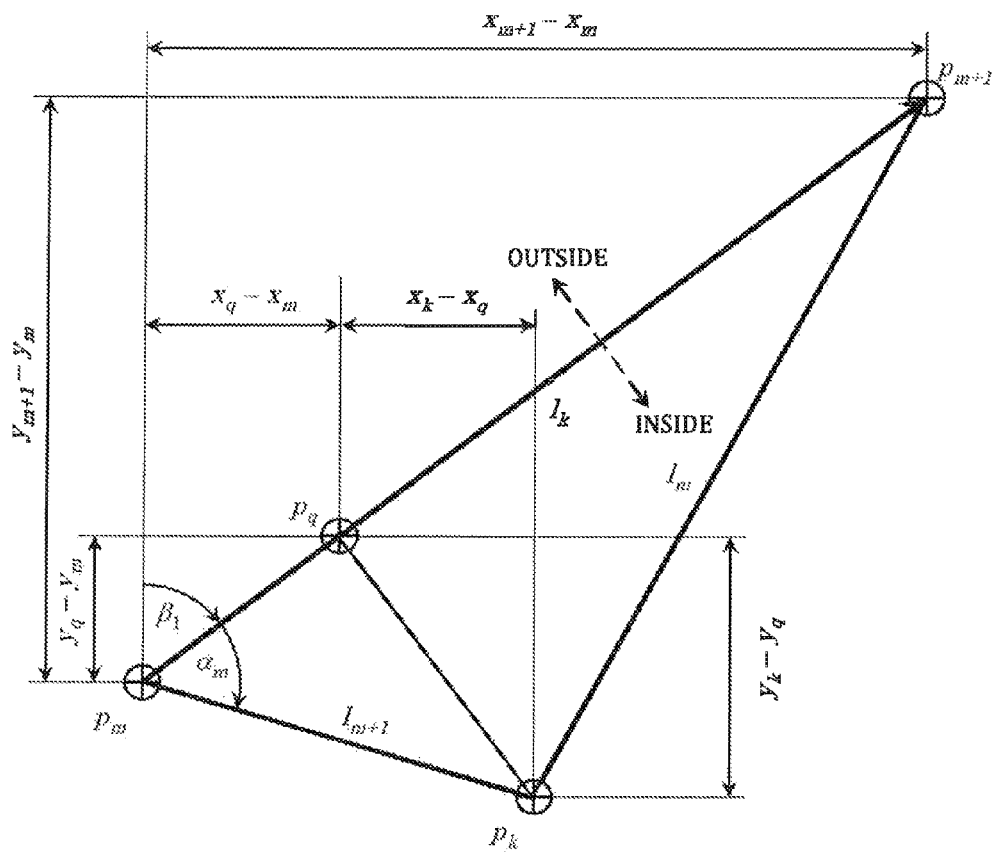

For the case where the angle $\beta_1$ is equal to or greater than zero and less than $\pi/2$ as illustrated in FIG. 15, it can be seen that as long as $x_k$ is greater than or equal to $x_q$ and $y_k$ is less than or equal to $y_q$, the condition point $p_k$ falls within the defined boundary. The following expressions can be used to define this case mathematically where:

$$f_1(\beta_1) = \frac{1}{4}\left(\frac{\pi/2 - \beta_1}{|\pi/2 - \beta_1| + \sigma} + 1\right) = 1$$

if $$0 \leq \beta_1 < \frac{\pi}{2}$$

otherwise $f_1(\beta_1)=0$.
And $$f_1(x, y) = \frac{1}{4}\left(\frac{x_k - x_q + \sigma}{|x_k - x_q| + \sigma} + 1\right)\left(\frac{y_q - y_k + \sigma}{|x_q - x_k| + \sigma} + 1\right) = 1$$

if the condition point $p_k$ lies below and to the right of the reference point $p_q$ otherwise $f_1(x,y)=0$.

Angle $\beta_1$ equal to $\pi/2$

Figure 16:
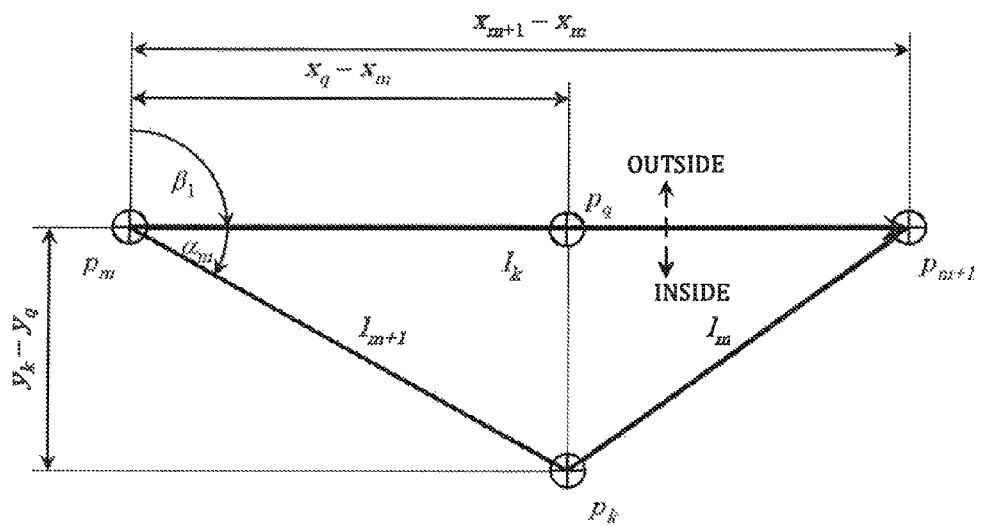

For the case where the angle $\beta_1$ is equal to $\pi/2$ as illustrated in FIG. 16, it can be seen that as long as $y_k$ is less than or equal to $y_q$, the condition point $p_k$ falls within the defined boundary. The following expressions can be used to define this case mathematically where:

$$f_2(\beta_1) = \frac{1}{4}\left(\frac{\beta_1 - \pi/2 + \sigma}{|\beta_1 - \pi/2| + \sigma} + 1\right)\left(\frac{\pi/2 - \beta_1 + \sigma}{|\pi/2 - \beta_1| + \sigma} + 1\right) = 1$$

if $$\beta_1 = \frac{\pi}{2}$$

otherwise $f_2(\beta_1)=0$.
And $$f_2(x, y) = \frac{1}{2}\left(\frac{y_q - y_k + \sigma}{|y_q - y_k| + \sigma} + 1\right) = 1$$

if the condition point $p_k$ lies below the reference point $p_q$ otherwise $f_2(X,y)=0$.

Angle $\beta_1$ greater than or equal to $\pi/2$ and less than $\pi$

Figure 17:
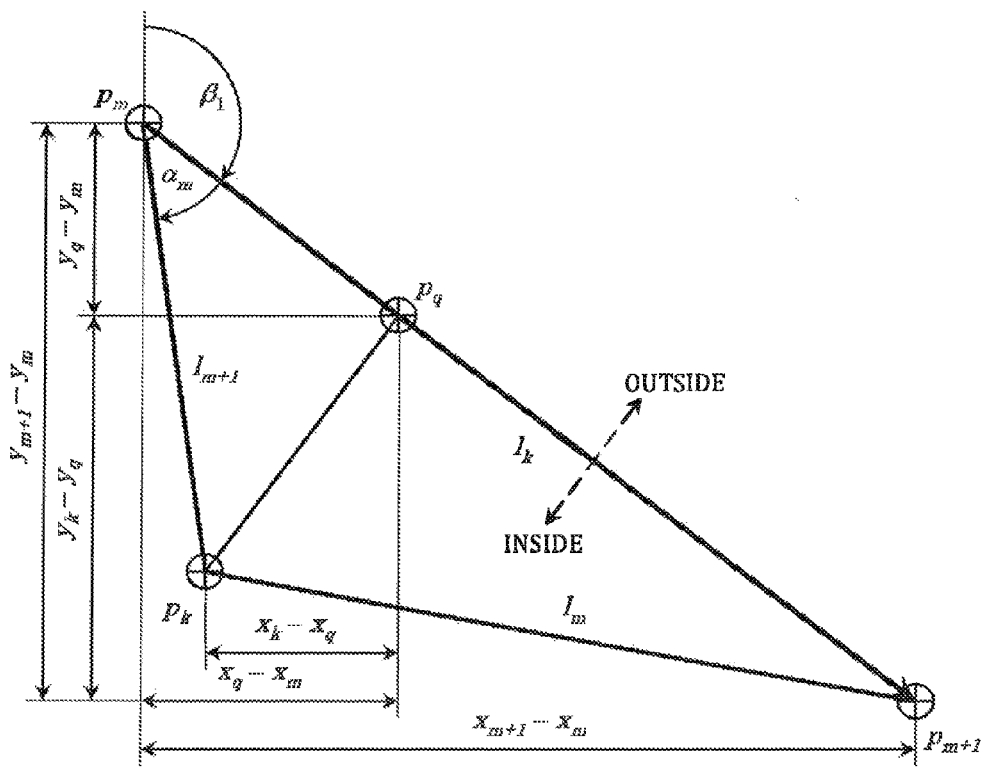

For the case where the angle $\beta_1$ is equal to or greater than $\pi/2$ and less than $\pi$ as illustrated in FIG. 17, it can be seen that as long as $x_k$ is less than or equal to $x_q$ and $y_k$ is less than or equal to $y_q$, the condition point $p_k$ falls within the defined boundary. The following expressions can be used to define this case mathematically where:

$$f_3(\beta_1) = \frac{1}{4}\left(\frac{\beta_1 - \pi/2 + \sigma}{|\beta_1 - \pi/2| + \sigma} + 1\right)\left(\frac{\pi - \beta_1}{|\pi - \beta_1| + \sigma} + 1\right) = 1$$

if $$\frac{\pi}{2} \leq \beta_1 < \pi$$

otherwise $f_3(\beta_1)=0$.
And $$f_3(x, y) = \frac{1}{4}\left(\frac{x_q - x_k + \sigma}{|x_q - x_k| + \sigma} + 1\right)\left(\frac{y_q - y_k + \sigma}{|y_q - y_k| + \sigma} + 1\right) = 1$$

if condition point $p_k$ lies below and to the left of reference point $p_q$ otherwise $f_3(x,y)=0$.

Angle $\beta_1$ equal to $\pi$

Figure 18:
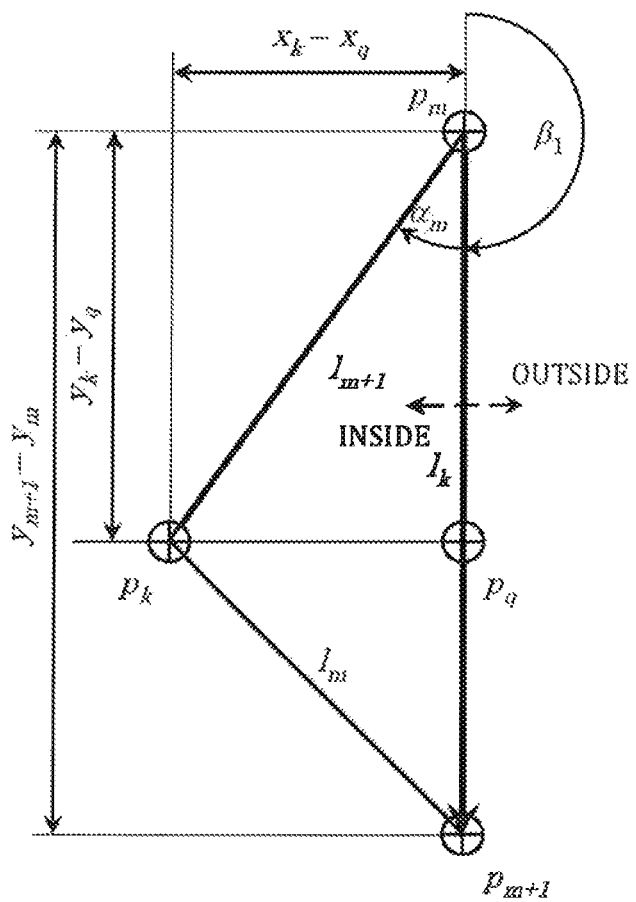
Figure 19:
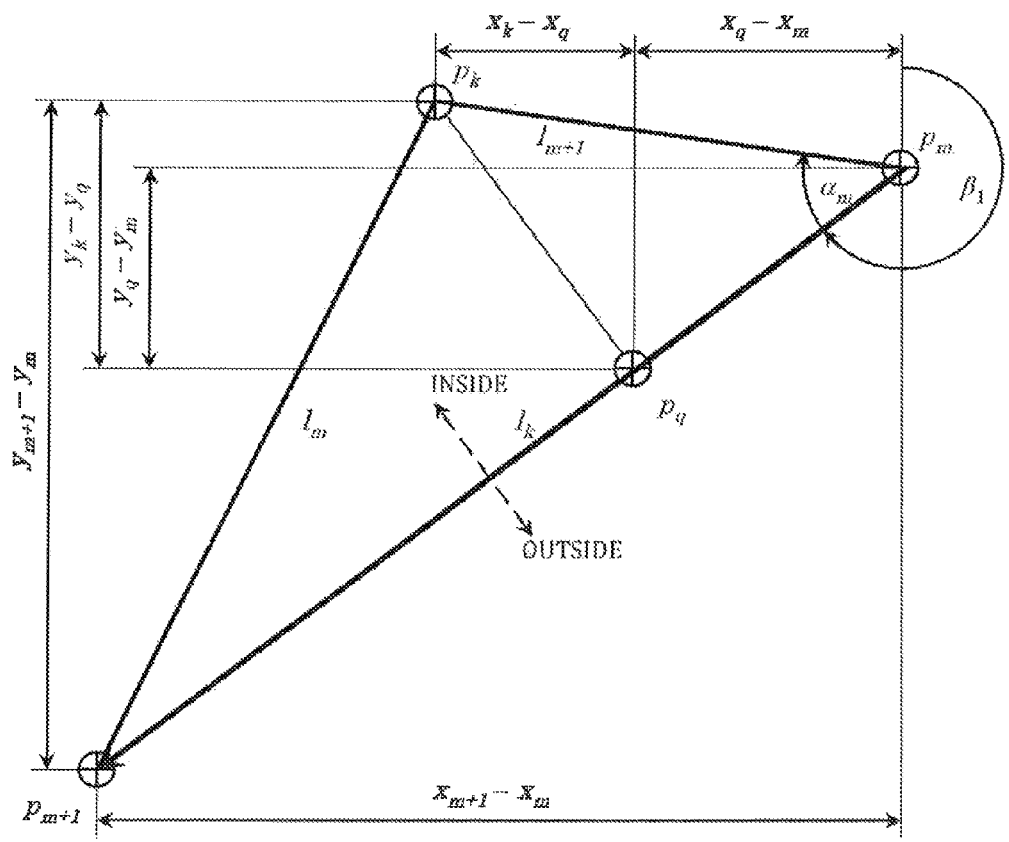

For the case where the angle $\beta_1$ is equal to $\pi$ as illustrated in FIG. 18, it can be seen that as long as $x_k$ is less than or equal to $x_q$, the condition point $p_k$ falls within the defined boundary. The following expressions can be used to define this case mathematically where:

$$f_4(\beta_1) = \frac{1}{4}\left(\frac{\beta_1 - \pi + \sigma}{|\beta_1 - \pi| + \sigma} + 1\right)\left(\frac{\pi - \beta_1 + \sigma}{|\pi - \beta_1| + \sigma} + 1\right) = 1$$

when $\beta_1=\pi$ otherwise it equals 0.
And $$f_4(x, y) = \frac{1}{2}\left(\frac{x_q - x_k + \sigma}{|x_q - x_k| + \sigma} + 1\right) = 1$$

if the condition point $p_k$ lies to the left of the reference point $p_q$ otherwise $f_4(x,y)=0$ Angle $\beta_1$ greater than or equal to $\pi$ and less than $3\pi/2$ For the case where the angle $\beta_1$ is equal to or greater than $\pi$ and less than $3\pi/2$ as illustrated in FIG. 19, it can be seen that as long as $x_k$ is less than or equal to $x_q$ and $y_k$ is greater than or equal to $y_q$, the condition point $p_k$ falls within the defined boundary. The following expressions can be used to define this case mathematically where:

$$f_5(\beta_1) = \frac{1}{4}\left(\frac{\beta_1 - \pi + \sigma}{|\beta_1 - \pi| + \sigma} + 1\right)\left(\frac{3\pi/2 - \beta_1}{|3\pi/2 - \beta_1| + \sigma} + 1\right) = 1$$

if $$\pi \leq \beta_1 < \frac{3}{2}\pi$$

otherwise $f_5(\beta_1)=0$.

And $$f_5(x, y) = \frac{1}{4}\left(\frac{x_q - x_k + \sigma}{|x_q - x_k| + \sigma} + 1\right)\left(\frac{y_k - y_q + \sigma}{|y_k - y_q| + \sigma} + 1\right) = 1$$

if the condition point $p_k$ lies above and to the left of the reference point $p_q$ otherwise $f_5(x,y)=0$.

Angle $\beta_1$ equal to $3\pi/2$

Figure 20:
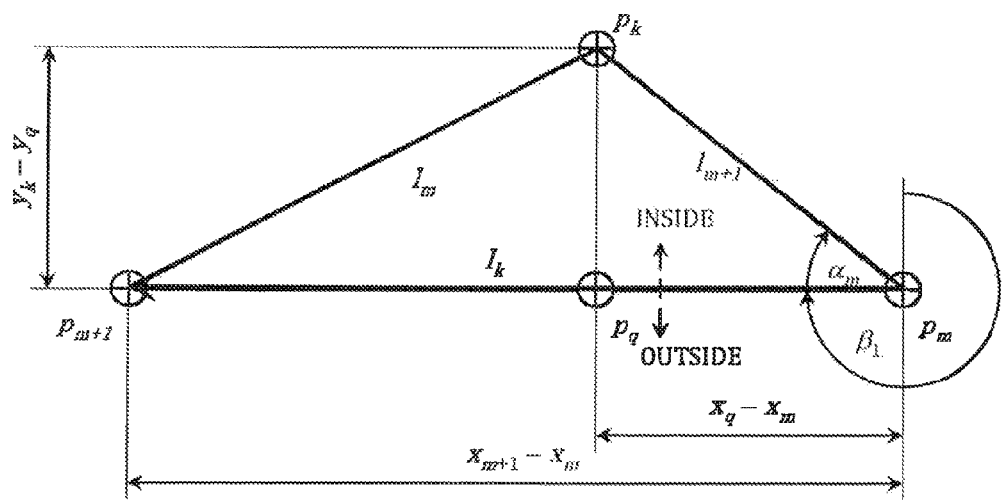

For the case where the angle $\beta_1$ is equal to $3\pi/2$ as illustrated in FIG. 20, it can be seen that as long as $y_k$ is greater than or equal to $y_q$, the condition point $p_k$ falls within the defined boundary. The following expressions can be used to define this case mathematically where:

$$f_6(\beta_1) = \frac{1}{4}\left(\frac{\beta_1 - 3\pi/2 + \sigma}{|\beta_1 - 3\pi/2| + \sigma} + 1\right)\left(\frac{3\pi/2 - \beta_1 + \sigma}{|3\pi/2 - \beta_1| + \sigma} + 1\right) = 1$$

when $$\beta_1 = \frac{3}{2}\pi$$

otherwise $f_6(\beta_1)=0$.
And $$f_6(x, y) = \frac{1}{2}\left(\frac{y_k - y_q + \sigma}{|y_k - y_q| + \sigma} + 1\right) = 1$$

if the condition point $p_k$ lies above the reference point $p_q$ otherwise $f_6(x,y)=0$.

Angle $\beta_1$ greater than or equal to $3\pi/2$ and less than $2\pi$

Figure 21:
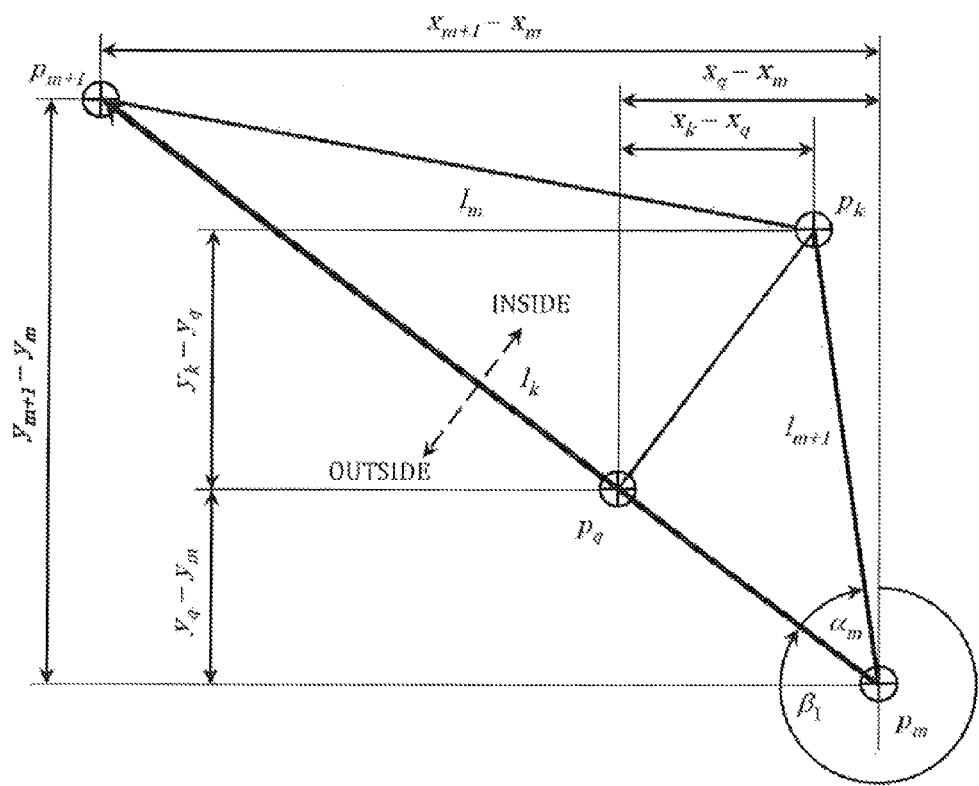

For the case where the angle $\beta_1$ is equal to or greater than $3\pi/2$ and less than $2\pi$ as illustrated in FIG. 21, it can be seen that as long as $x_k$ is greater than or equal to $x_q$ and $y_k$ is greater than or equal to $y_q$, the condition point $p_k$ falls within the defined boundary. The following expressions can be used to define this case mathematically where;

$$f_7(\beta_1) = \frac{1}{4}\left(\frac{\beta_1 - 3\pi/2 + \sigma}{|\beta_1 - 3\pi/2| + \sigma} + 1\right)\left(\frac{2\pi - \beta_1}{|2\pi - \beta_1| + \sigma} + 1\right) = 1$$

if $$\frac{3}{2}\pi \le \beta_1 < 2\pi$$

otherwise $f_7(\beta_1)=0$.
And $$f_7(x, y) = \frac{1}{4}\left(\frac{x_k - x_q + \sigma}{|x_k - x_q| + \sigma} + 1\right)\left(\frac{y_k - y_q + \sigma}{|y_k - y_q| + \sigma} + 1\right) = 1$$

if the condition point $p_k$ lies above and to the right of the reference point $p_q$ otherwise $f_7(x,y)=0$.

Angle $\beta_1$ equal to 0

Figure 22:
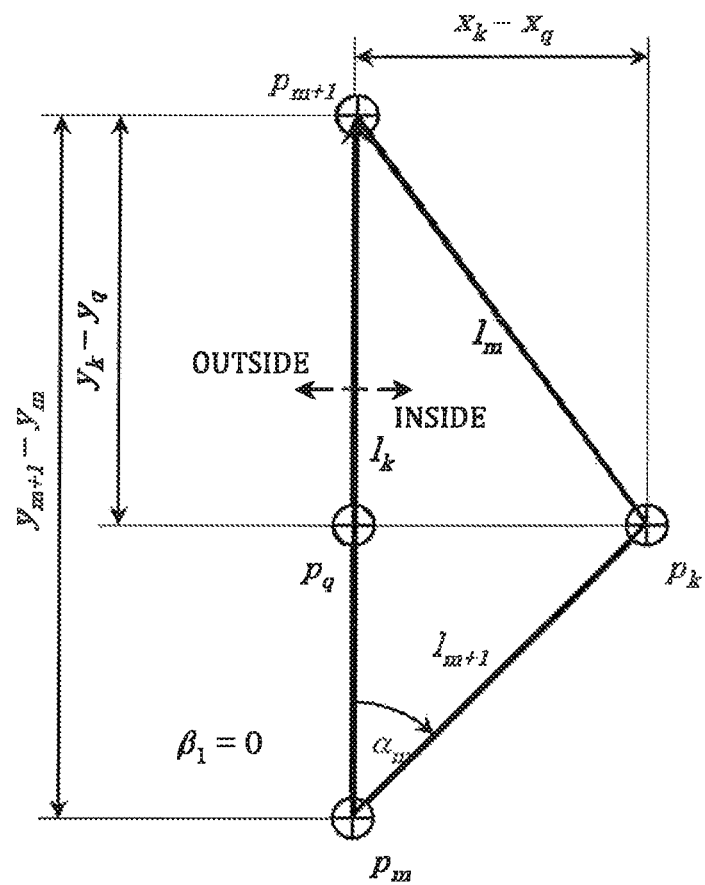

For the case where the angle $\beta_1$ is equal to zero as illustrated in FIG. 22, it can be seen that as long as $x_k$ is greater than or equal to $x_q$, the condition point $p_k$ falls within the defined boundary. The following expressions can be used to define this case mathematically where:

$$f_8(\beta_1) = \frac{1}{4}\left(\frac{\beta_1 - 0 + \sigma}{|\beta_1 - 0| + \sigma} + 1\right)\left(\frac{0 - \beta_1 + \sigma}{|0 - \beta_1| + \sigma} + 1\right) = 1$$

when $\beta_1=0$ otherwise $f_6(\beta_1)=0$.
And $$f_8(x, y) = \frac{1}{2}\left(\frac{x_k - x_q + \sigma}{|x_k - x_q| + \sigma} + 1\right) = 1$$

if the condition point $p_k$ lies to the right of the reference point $p_q$ otherwise $f_8(x,y)=0$.

Using the above information, the on-board vehicle control system 12 determines in step S17 via the on-board vehicle controller 22 whether the vehicle condition lies within the area of interest 100 based on a comparison between coordinates of the condition point $p_k$ and the coordinate condition data. In particular, the controller 22 determines the following:

if $\sum_{i=1}^{8} Q_i = 1$ where:

$Q_1=f_1(\beta_1) \times f_1(x,y)$ $Q_2=f_2(\beta_1) \times f_2(x,y)$ $Q_3=f_3(\beta_1) \times f_3(x,y)$ $Q_4=f_4(\beta_1) \times f_4(x,y)$ $Q_5=f_5(\beta_1) \times f_5(x,y)$ $Q_6=f_6(\beta_1) \times f_6(x,y)$ $Q_7=f_7(\beta_1) \times f_7(x,y)$ $Q_8=f_8(\beta_1) \times f_8(x,y)$ then the condition point $p_k$ lies within the region defined by the circumferential path P otherwise it falls outside.

Thus, the processing can control the on-board vehicle controller 22 differently upon determination of the vehicle condition being located within the area of interest 100 (step S18) from a determination of the vehicle condition being located outside of the area of interest 100 (step S19). For example, as discussed above, the vehicle of interest can he a remote vehicle 14 which is different from a host vehicle 10 on which the on-board vehicle controller 22 is disposed, and the vehicle condition can represent a location of the remote vehicle 14. Thus, the processing can control an aspect of the host vehicle 10 differently upon a determination of the remote vehicle 14 being located within the area of interest 100 (step S18) from a determination of the remote vehicle 14 being located outside of the area of interest 100 (step S19). For example, when performing a contact warning operation, the controller 22 can classify a message from the remote vehicle 14 as irrelevant upon determination of the remote vehicle 14 being located outside of the area of interest 100. The processing can also perform any suitable vehicle control process, such as controlling a braking process, emitting a warning or warnings to be perceived by the driver of the host vehicle 10 and/or the driver of the remote vehicle 14, and so on, upon determining that the remote vehicle 14 is located within the area of interest 100, and different operations upon determining that remote vehicle 14 is located outside of the area of interest 100.

Alternatively, the vehicle of interest can be the host vehicle 10 on which the on-board vehicle controller 22 is disposed, and the vehicle condition can represent a location of the host vehicle 10. Thus, the processing can control an aspect of the host vehicle 10 differently upon a determination of the host vehicle 14 being located within the area of interest 100 (step S18) from a determination of the host vehicle 14 being located outside of the area of interest 100 (step S19). For example, the controller 22 can control the host vehicle 10 to operate in accordance with the regulations of Jurisdiction 1 in which the host vehicle 10 is present, until the controller determines the host vehicle 10 moved to be outside of Jurisdiction 1 and inside of Jurisdiction 2, with different regulations than that of Jurisdiction 1. Therefore, the controller controls the host vehicle 10 in a first manner (in accordance with the regulations of Jurisdiction 1) while inside Jurisdiction 1, and in a second manner (in accordance with the regulations of Jurisdiction 2) that is different from the first rammer while inside Jurisdiction 2.

Also, as discussed above, if the vehicle condition represents, for example, a speed and acceleration of the remote vehicle 14, the controller 22 can determine, for example, that the remote vehicle 14 is preparing to execute a turn when the vehicle condition is determined to lie within the area of interest 100 which represents predetermined relationships between vehicle speed and acceleration as discussed above. Accordingly, the controller 22 can control the host vehicle 10 to perform contact avoidance processes, warning processes and so on if it is determined that the remote vehicle 14 is about to execute a turn. Likewise, if the vehicle condition represents, for example, a speed and acceleration of the host vehicle 10, the controller 22 can determine, for example, that the host vehicle 10 is preparing to execute a turn when the vehicle condition is determined to lie within the area of interest 100 which represents predetermined relationships between vehicle speed and acceleration as discussed above. Accordingly, the controller 22 can control the host vehicle 10 to perform contact avoidance processes, warning processes and so on if it is determined that the host vehicle 10 is about to execute a turn.

It can further be appreciated that the above process shown in FIG. 9 can be performed repeatedly to determine, for example, whether a vehicle condition pertaining to at least one additional remote vehicle 14 is located within the area of interest 100. For example, if the vehicle condition represents a location of an additional remote vehicle 14, the processing can perform a comparison between geographic coordinates of an additional remote vehicle location of the at least one additional remote vehicle 14 and additional coordinate condition data, with the additional coordinate condition data of the at least one additional remote vehicle 14 being obtained by the above process. That is, the processing determines via the on-board vehicle controller 22 an additional first boundary point of the boundary points for the at least one additional remote vehicle 14 that is closest to the additional remote vehicle location, generating via the on-board vehicle controller 22 additional geometric data representing an additional geometric relationship between the additional first boundary point, the additional remote vehicle location and an additional second boundary point of the boundary points for the at least one additional remote vehicle 14. In this case, the geometric relationship includes an additional first straight line connecting the additional first boundary point and the additional remote vehicle location, an additional second straight line connecting the additional second boundary point and the additional vehicle location and an additional third straight line connecting the additional first and second boundary points. The processing thus calculates via the on-board vehicle controller 22 additional reference point data representing an additional reference point for the at least one additional remote vehicle 14 based on the additional geometric data, and determines via the on-board vehicle controller 22 the additional coordinate condition data based on an angle between a predetermined direction and a reference line connecting between the additional first boundary point and the additional reference point.

Accordingly, the processing can perform a collision warning process differently upon determination of the remote vehicle 14 and the at least one additional remote vehicle 14 being located within the area of interest 100 than when at least one of the remote vehicle 14 and the at least one additional remote vehicle 14 are located outside of the area of interest 100. Moreover, the processing can perform, for example, a vehicle navigation process differently upon determination that the remote vehicle 14 and the at least one additional remote vehicle 14 are located within the area of interest 100 as opposed to at least one of the remote vehicle 14 and the at least one additional remote vehicle 14 being located outside of the area of interest 100.

In addition, processing similar to that discussed above can be performed for any type of vehicle condition as discussed herein that is determined with respect to an additional remote vehicle 14.

Figure 8:
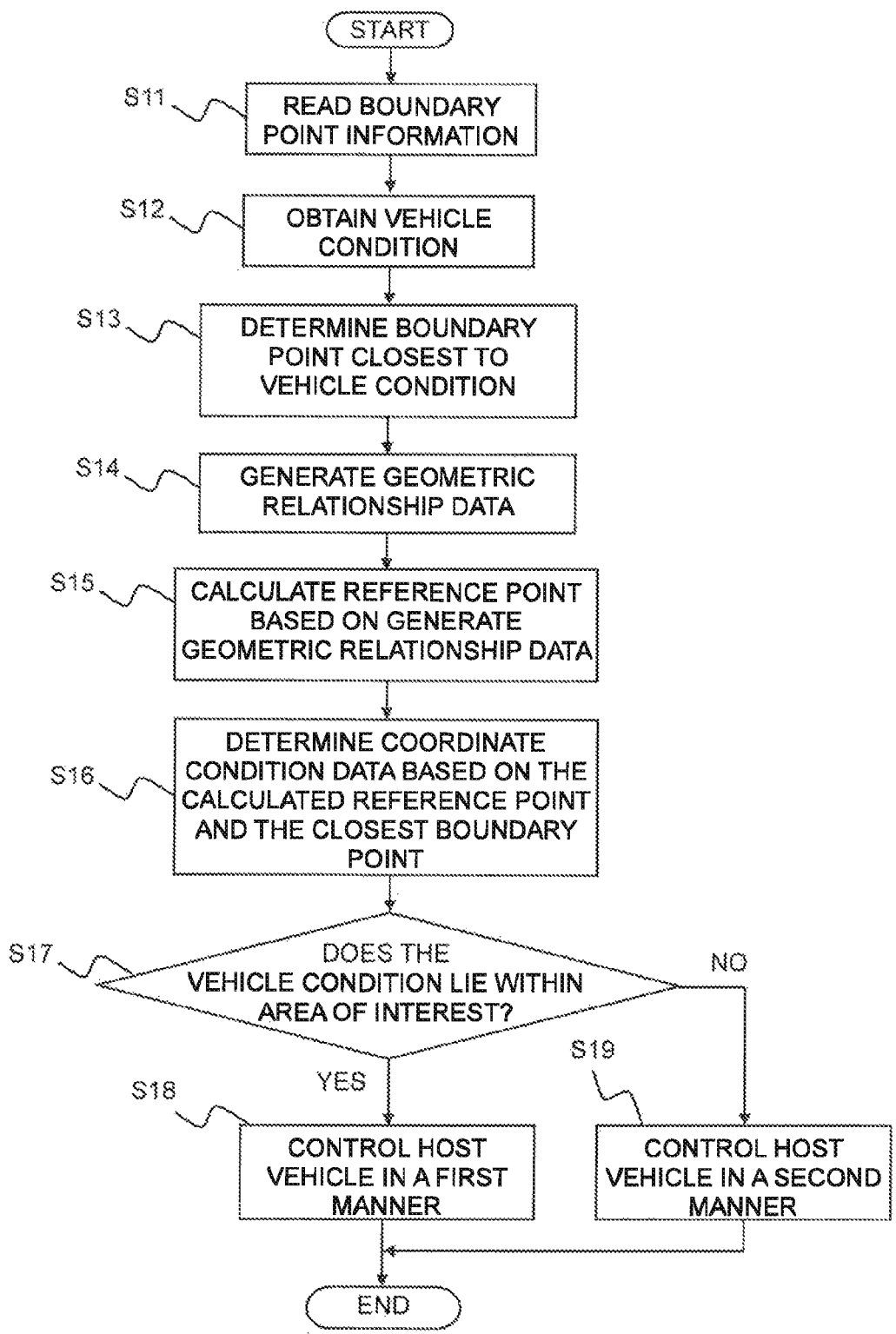
FIG. 8 is a flowchart illustrating examples of operations performed by the on-board vehicle control system according to the embodiments described herein to determine whether determined values, such as those representing a vehicle location or a vehicle condition, lies inside or outside an area of interest.

Moreover, when the host vehicle 10 is moving and the area of interest 100 is changing and/or moving as shown in FIGS. 4 and 5 above, the processing shown in FIG. 8 and discussed. above can repeat to recalculate the locations and information discussed above with respect to the new location of the host vehicle 10 and the boundary points of the area of interest 100. The controller 22 can update or otherwise store that information in the database of the storage device 28 or in any other suitable location. Moreover, if the host vehicle 10 moves from one jurisdiction to another as shown in FIG. 5, the processing performed by the controller 22 can control the host vehicle 10 to operate in accordance with the requirements of that new jurisdiction.

As can be appreciated from the above, this methodology can be employed to determine whether a point lies within a defined region whether the region is geographic in nature or something completely abstract, such as a region defined by engine revolutions per minute (rpms) and fuel consumption that is used to optimize or at least improve operations of the host vehicle 10 to improve fuel efficiency as understood in the art. Thus, the methodology can be applicable to any situation involving multiple parameters and a selected, complexly-shaped, region that is defined by a plurality of data points for indicating a situation in which, for example, and indication such as a warning should be provided. The methodology is particularly useful for evaluating a complex area of interest defined by scattered boundary points, which is much more difficult to evaluate than a well-defined area that can be analyzed by, for example, merely determining if a value of interest is above or below a simple threshold. The methodology can thus provide a much. more precise evaluation to provide a much more precise indication, such as a precise warning, than can be achieved by simple threshold-based determination as understood in the art, While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An on-board vehicle control method comprising:
    storing information representing a plurality of boundary points of a boundary that circumscribes an area of interest;
    obtaining a vehicle location of a vehicle of interest;
    determining via an on-board vehicle controller a first boundary point of the boundary points that is closest to the vehicle location;
    generating via the on-board vehicle controller data representing a geometric relationship between the first boundary point, the vehicle location and a second boundary point of the boundary points, the geometric relationship including a first straight line connecting the first boundary point and the vehicle location, a second straight line connecting the second boundary point and the vehicle location and a third straight line connecting the first and second boundary points;
    calculating via the on-board vehicle controller reference point data representing a reference point based on the data representing the geometric relationship;
    determining via the on-board vehicle controller coordinate condition data based on an angle between a predetermined direction and a reference line connecting between the first boundary point and the reference point; and
    determining via the on-board vehicle controller whether the vehicle location lies within the area of interest based on a comparison between geographic coordinates of the vehicle location and the coordinate condition data.

2. The on-board vehicle control method according to claim 1, further comprising
    controlling the on-board vehicle controller differently upon determination of the vehicle of interest being located within the area of interest from a determination of the vehicle of interest being located outside of the area of interest.

3. The on-board vehicle control method according to claim 1, wherein the vehicle of interest is a remote vehicle which is different from a host vehicle on which the on-board vehicle controller is disposed.

4. The on-board vehicle control method according to claim 3, further comprising
    controlling an aspect of the host vehicle differently upon a determination of the remote vehicle being located within the area of interest from a determination of the remote vehicle being located outside of the area of interest.

5. The on-board vehicle control method according to claim 4, wherein
    the controlling of the aspect of the host vehicle includes classifying a message from the remote vehicle as irrelevant upon determination of the remote vehicle being located outside of the area of interest.

6. The on-board vehicle control method according to claim 4, wherein
    the controlling of the aspect of the host vehicle includes performing a vehicle control process upon determination of the remote vehicle being located within the area of interest from a determination of the remote vehicle being located outside of the area of interest.

7. The onboard vehicle control method according to claim 6, further comprising
    performing a determination of whether at least one additional remote vehicle is located within the area of interest based on a comparison between geographic coordinates of an additional remote vehicle location of the at least one additional remote vehicle and additional coordinate condition data, with the additional coordinate condition data of the at least one additional remote vehicle being obtained by
        determining via the on-board vehicle controller an additional first boundary point of the boundary points for the at least one additional remote vehicle that is closest to the additional remote vehicle location,
        generating via the on-board vehicle controller additional data representing an additional geometric relationship between the additional first boundary point, the additional remote vehicle location and an additional second boundary point of the boundary points for the at least one additional remote vehicle, the geometric relationship including an additional first straight line connecting the additional first boundary point and the additional remote vehicle location, an additional second straight line connecting the additional second boundary point and the additional vehicle location and an additional third straight line connecting the additional first and second boundary points,
        calculating via the on-board vehicle controller additional reference point data representing an additional reference point for the at least one additional remote vehicle based on the additional data representing the additional geometric relationship, and
        determining via the on-board vehicle controller the additional coordinate condition data based on an angle between a predetermined direction and a reference line connecting between the additional first boundary point and the additional reference point.

8. The on-board vehicle control method according to claim 7, wherein
    the performing of the vehicle control process includes performing a collision warning process differently upon determination of the remote vehicle and the at least one additional remote vehicle being located within the area of interest from a determination of at least one of the remote vehicle and the at least one additional remote vehicle being located outside of the area of interest.

9. The on-board vehicle control method according to claim 7, wherein
    the performing of the vehicle control process includes performing a vehicle navigation process differently upon determination of the remote vehicle and the at least one additional remote vehicle being located within the area of interest from a determination of at least one of the remote vehicle and the at least one additional remote vehicle being located outside of the area of interest.

10. The on-board vehicle control method according to claim 3, further comprising
obtaining an updated vehicle location of the remote vehicle in response to movement of the remote vehicle;
determining via the on-board vehicle controller a different first boundary point of the boundary points that is closest to the updated vehicle location;
generating via the onboard vehicle controller different data representing a different geometric relationship between the different first boundary point, the updated vehicle location and a different second boundary point of the boundary points, the different geometric relationship including a different first straight line connecting the different first boundary point and the updated vehicle location, a different second straight line connecting the different second boundary point and the updated vehicle location and a different third straight line connecting the different first and second boundary points;
calculating via the on-board vehicle controller different reference point data representing a different reference point based on the different data representing the different geometric relationship;
determining via the on-board vehicle controller different coordinate condition data based on a different angle between the predetermined direction and a different reference line connecting between the different first boundary point and the different reference point; and
determining via the on-board vehicle controller whether the updated vehicle location lies within the area of interest based on a comparison between geographic coordinates of the updated vehicle location and the different coordinate condition data.

11. The on-board vehicle control method according to claim 3, further comprising
updating the stored information to represent a plurality of updated boundary points of an updated boundary that circumscribes an updated area of interest that is different from the area of interest based on a movement of the host vehicle;
obtaining an updated vehicle location of the vehicle of interest;
determining via the on-board vehicle controller an updated first boundary point of the updated boundary points that is closest to the updated vehicle location;
generating via the on-board vehicle controller updated data representing a updated geometric relationship between the updated first boundary point, the updated vehicle location and an updated second boundary point of the updated boundary points, the updated geometric relationship including an updated first straight line connecting the updated first boundary point and the updated vehicle location, an updated second straight line connecting the updated second boundary point and the updated vehicle location and an updated third straight line connecting the updated first and second boundary points;
calculating via the on-board vehicle controller different reference point data representing a different reference point based on the different data representing the different geometric relationship;
determining via the on-board vehicle controller different coordinate condition data based on a different angle between the predetermined direction and a different reference line connecting between the different first boundary point and the different reference point; and
determining via the on-board vehicle controller whether the updated vehicle location lies within the different area of interest based on a comparison between geographic coordinates of the updated vehicle location and the different coordinate condition data.

12. The on-board vehicle control method according to claim 1, wherein the vehicle of interest is a host vehicle on which the on-board vehicle controller is disposed.

13. The on-board vehicle control method according to claim 12, wherein
the area of interest is a geographic area within a jurisdiction governed by regulations pertaining to certain vehicle operating conditions.

14. The on-board vehicle control method according to claim 13, further comprising
controlling an aspect of the host vehicle via the on-board controller to operate in accordance with the regulations pertaining to the certain vehicle operating conditions.

15. The on-board vehicle control method according to claim 12, further comprising
obtaining an updated vehicle location of the host vehicle in response to movement of the host vehicle;
determining via the on-board vehicle controller a different first boundary point of the boundary points that is closest to the updated vehicle location;
generating via the on-board vehicle controller different data representing a different geometric relationship between the different first boundary point, the updated vehicle location and a different. second boundary point of the boundary points, the different geometric relationship including a different first straight line connecting the different first boundary point and the updated vehicle location, a different second straight line connecting the different second boundary point and the updated vehicle location and a different third straight line connecting the different first and second boundary points;
calculating via the on-board vehicle controller different reference point data representing a different reference point based on the different data representing the different geometric relationship;
determining via the on-board vehicle controller different coordinate condition data based on a different angle between the predetermined direction and a different reference line connecting between the different first boundary point and the different reference point; and
determining via the on-board vehicle controller whether the updated vehicle location lies within the area of interest based on a comparison between geographic coordinates of the updated vehicle location and the different coordinate condition data.

16. The on-board vehicle control method according to claim 12, further comprising
storing information representing a plurality of additional boundary points of an additional boundary that circumscribes an additional area of interest;
obtaining an updated vehicle location of the vehicle of interest;
determining via the on-board vehicle controller an additional first boundary point of the additional boundary points that is closest to the updated vehicle location;
generating via the on-board vehicle controller additional data representing an additional geometric relationship between the additional first boundary point, the updated vehicle location and an additional second boundary point of the additional boundary points, the additional geometric relationship including an additional first straight line connecting the additional first boundary point and the updated vehicle location, an additional second straight line connecting the additional second boundary point and the updated vehicle location and an additional third straight line connecting the additional first and second boundary points;

calculating via the on-board vehicle controller additional reference point data representing an additional reference point based on the additional data representing the additional geometric relationship;

determining via the on-board vehicle controller additional coordinate condition data based on an additional angle between the predetermined direction and an additional reference line connecting between the additional first boundary point and the additional reference point; and determining via the on-board vehicle controller whether the updated vehicle location lies within the additional area of interest based on a comparison between geographic coordinates of the updated vehicle location and the additional coordinate condition data.

17. The on-board vehicle control method according to claim 1, further comprising determining the second boundary point by identifying via the on-board vehicle controller an adjacent one of the boundary points that is next in sequence from the first boundary point in a direction along the boundary, and selecting the adjacent one of the boundary points as the second boundary point.

18. An on-board vehicle control system comprising:

a storage device configured to store information representing a plurality of boundary points of a boundary that circumscribes an area of interest; and a controller configured to obtain a vehicle location of a vehicle of interest, determine a first boundary point of the boundary points that is closest to the vehicle location, generate data representing a geometric relationship between the first boundary point, the vehicle location and a second boundary point of the boundary points, with the geometric relationship including a first straight line connecting the first boundary point and the vehicle location, a second straight line connecting the second boundary point and the vehicle location and a third straight line connecting the first and second boundary points, calculate reference point data representing a reference point based on the data representing the geometric relationship, determine coordinate condition data based on an angle between a predetermined direction and a reference line connecting between the first boundary point and the reference point, and determine whether the vehicle location lies within the area of interest based on a comparison between geographic coordinates of the vehicle location and the coordinate condition data.

19. The onboard vehicle control system according to claim 18, wherein the controller is configured to control an aspect of a host vehicle upon which the controller is disposed differently upon determination of the vehicle of interest being located within the area of interest from a determination of the vehicle of interest being located outside of the area of interest.

20. The on-hoard vehicle control system according to claim 18, wherein the vehicle of interest is a remote vehicle which is different from a host vehicle on which the controller is disposed; and the controller is configured to control an aspect of the host vehicle differently upon a determination of the remote vehicle being located within the area of interest from a determination of the remote vehicle being located outside of the area of interest.

21. The on-board vehicle control system according to claim 18, wherein the vehicle of interest is a host vehicle on which the controller is disposed; and the controller is configured to control an aspect of the host vehicle differently upon a determination of the host vehicle being located within the area of interest from a determination of the host vehicle being located outside of the area of interest.

* * * * *